United States Patent [19]

Nomoto et al.

[11] Patent Number: 5,761,388
[45] Date of Patent: Jun. 2, 1998

[54] FUZZY THESAURUS GENERATOR

[75] Inventors: Kohei Nomoto; Takahiro Kubo; Yoshio Kosuge, all of Tokyo, Japan

[73] Assignee: Mitsubishi Denki Kabushiki Kaisha, Tokyo, Japan

[21] Appl. No.: 600,033

[22] Filed: Feb. 12, 1996

[30] Foreign Application Priority Data

Feb. 28, 1995 [JP] Japan .................................. 7-040060

[51] Int. Cl.$^6$ ....................................................... G06F 17/30
[52] U.S. Cl. .................................................. 395/61; 395/934
[58] Field of Search .............................. 395/61, 75, 934, 395/76, 601, 51

[56] References Cited

U.S. PATENT DOCUMENTS

| | | | |
|---|---|---|---|
| 5,020,019 | 5/1991 | Ogawa | 395/61 |
| 5,168,565 | 12/1992 | Morita | 395/601 |
| 5,583,966 | 12/1996 | Nakajima | 395/51 |

OTHER PUBLICATIONS

G. Salton, "Automatic Information Retrieval," IEEE Computer, pp. 41–55, Sep. 1980.

K. Nomoto, et al., "A document retrieval system based on citations using fuzzy graphs," Fuzzy Sets and Systems, V. 38, pp. 207–222, Dec. 1990.

P.P. Bonissone and S. Ayub, "Similarity Measures for Case-Based Reasoning Systems," Int'l. Conf. on Information Processing and Management of Uncertainty in Knowledge-Based Systems, pp. 161–172, Dec. 1993.

C. Vasudevan, et al., "Fuzzy Logic in Case-Based Reasoning," Proc. 1st Int'l. J. Conf. of the N. Amer. Fuzzy Info. Processing Society, pp. 301–302, Dec. 1994.

C. Vasudevan, "An Experience-Based Approach to Software Project Management," Proc. Int'l. Conf. on Tools with Artificial Intelligence, pp. 624–630, Nov. 1994.

B.C. Jeng and T.-P. Liang, "Fuzzy Indexing and Retrieval in Case-Based Systems," Expert Systems with Applications, vol. 8(1), pp. 135–142, Jan. 1995.

K. Nomoto, et al., "Fuzzy Thesaurus Generation Based on Cross–Index Matrix for Case–Based Reasoning," 1995 IEEE Int'l. Conf. on Systems, Man and Cybernetics, vol. 5, pp. 4033–4038, Oct. 1995.

"Seminar Fuzzy", vol. 9 by Fuzzy Data Base and Information Retrieval, 1993.

*Primary Examiner*—Robert W. Downs
*Attorney, Agent, or Firm*—Wolf, Greenfield & Sacks, P.C.

[57] ABSTRACT

There is provided by the present invention a database of cases in which index-labeled case data is accumulated, an index appearance matrix generator for generating an index appearance matrix as a target according to a first index from the case data an index appearance matrix generator for generating a index appearance matrix as a reference according to a second index from the case data, a cross index matrix generator for generating a cross index matrix from these index appearance matrixes, an inter-index attribute value fuzzy relation computing section for computing a fuzzy relation between index attribute values from the cross index matrix, and a fuzzy thesaurus generating section for generating a fuzzy thesaurus from a fuzzy relation between the index attribute values.

40 Claims, 24 Drawing Sheets

FIG. 2

EXAMPLE OF APPEARANCE MATRIX $A(k_1, 0)$ IN THE INDEX $k_1$

| | | CASES | | | | | | | | | | |
|---|---|---|---|---|---|---|---|---|---|---|---|---|
| | | $k_{0,1}$ | $k_{0,2}$ | $k_{0,3}$ | $k_{0,4}$ | $k_{0,5}$ | $k_{0,6}$ | $k_{0,7}$ | $k_{0,8}$ | $k_{0,9}$ | $k_{0,10}$ | $k_{0,11}$ |
| INDEX ATTRIBUTE VALUE IN THE INDEX $k_1$ | $k_{1,1}$ | 1 | 0 | 0 | 0 | 0 | 1 | 0 | 0 | 1 | 0 | 0 |
| | $k_{1,2}$ | 0 | 0 | 0 | 1 | 0 | 0 | 0 | 0 | 0 | 1 | 0 |
| | $k_{1,3}$ | 0 | 1 | 0 | 0 | 1 | 0 | 1 | 0 | 0 | 0 | 1 |
| | $k_{1,4}$ | 0 | 0 | 1 | 0 | 0 | 0 | 0 | 1 | 0 | 0 | 0 |

FIG. 3

EXAMPLE OF APPEARANCE MATRIX $A(k_2, 0)$ IN THE INDEX $k_2$

| | | CASES | | | | | | | | | | |
|---|---|---|---|---|---|---|---|---|---|---|---|---|
| | | $k_{0,1}$ | $k_{0,2}$ | $k_{0,3}$ | $k_{0,4}$ | $k_{0,5}$ | $k_{0,6}$ | $k_{0,7}$ | $k_{0,8}$ | $k_{0,9}$ | $k_{0,10}$ | $k_{0,11}$ |
| INDEX ATTRIBUTE VALUE IN THE INDEX $k_2$ | $k_{2,1}$ | 1 | 1 | 0 | 0 | 0 | 1 | 0 | 0 | 0 | 1 | 0 |
| | $k_{2,2}$ | 0 | 0 | 0 | 1 | 0 | 0 | 1 | 0 | 0 | 0 | 1 |
| | $k_{2,3}$ | 0 | 0 | 1 | 0 | 0 | 0 | 0 | 0 | 1 | 0 | 0 |
| | $k_{2,4}$ | 0 | 0 | 0 | 0 | 1 | 0 | 0 | 1 | 0 | 0 | 0 |

F I G. 4

|  |  | INDEX ATTRIBUTE VALUE IN THE INDEX $k_2$ | | | |
|---|---|---|---|---|---|
|  |  | $k_{2,1}$ | $k_{2,2}$ | $k_{2,3}$ | $k_{2,4}$ |
| INDEX ATTRIBUTE VALUE IN THE INDEX $k_1$ | $k_{1,1}$ | 2 | 0 | 1 | 0 |
|  | $k_{1,2}$ | 1 | 1 | 0 | 0 |
|  | $k_{1,3}$ | 1 | 2 | 0 | 1 |
|  | $k_{1,4}$ | 0 | 0 | 1 | 1 |

F I G. 5

|  |  | INDEX ATTRIBUTE VALUE IN THE INDEX $k_2$ | | | |
|---|---|---|---|---|---|
|  |  | $k_{2,1}$ | $k_{2,2}$ | $k_{2,3}$ | $k_{2,4}$ |
| INDEX ATTRIBUTE VALUE IN THE INDEX $k_1$ | $k_{1,1}$ | 1.0 | 0.5 | 0.25 | 0.5 |
|  | $k_{1,2}$ | 0.33 | 1.0 | 0.5 | 0.0 |
|  | $k_{1,3}$ | 0.33 | 1.0 | 1.0 | 0.5 |
|  | $k_{1,4}$ | 0.33 | 0.0 | 0.25 | 1.0 |

F I G. 6

|  |  | INDEX ATTRIBUTE VALUE IN THE INDEX $k_1$ | | | |
|---|---|---|---|---|---|
|  |  | $k_{1,1}$ | $k_{1,2}$ | $k_{1,3}$ | $k_{1,4}$ |
| INDEX ATTRIBUTE VALUE IN THE INDEX $k_1$ | $k_{1,1}$ | 1.0 | 0.33 | 0.25 | 0.33 |
| | $k_{1,2}$ | 0.33 | 1.0 | 0.5 | 0.0 |
| | $k_{1,3}$ | 0.25 | 0.5 | 1.0 | 0.25 |
| | $k_{1,4}$ | 0.33 | 0.0 | 0.25 | 1.0 |

F I G. 7
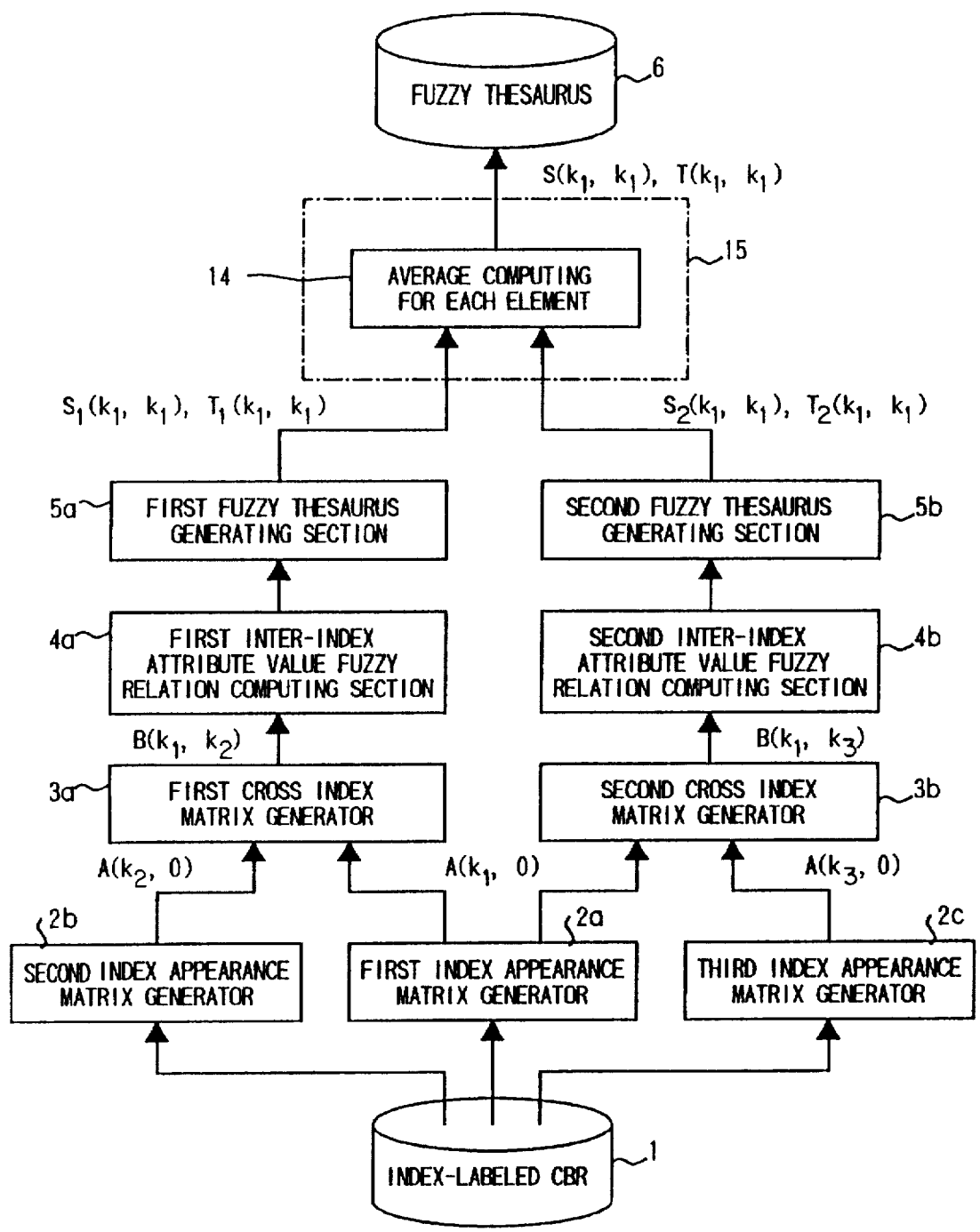

F I G. 8
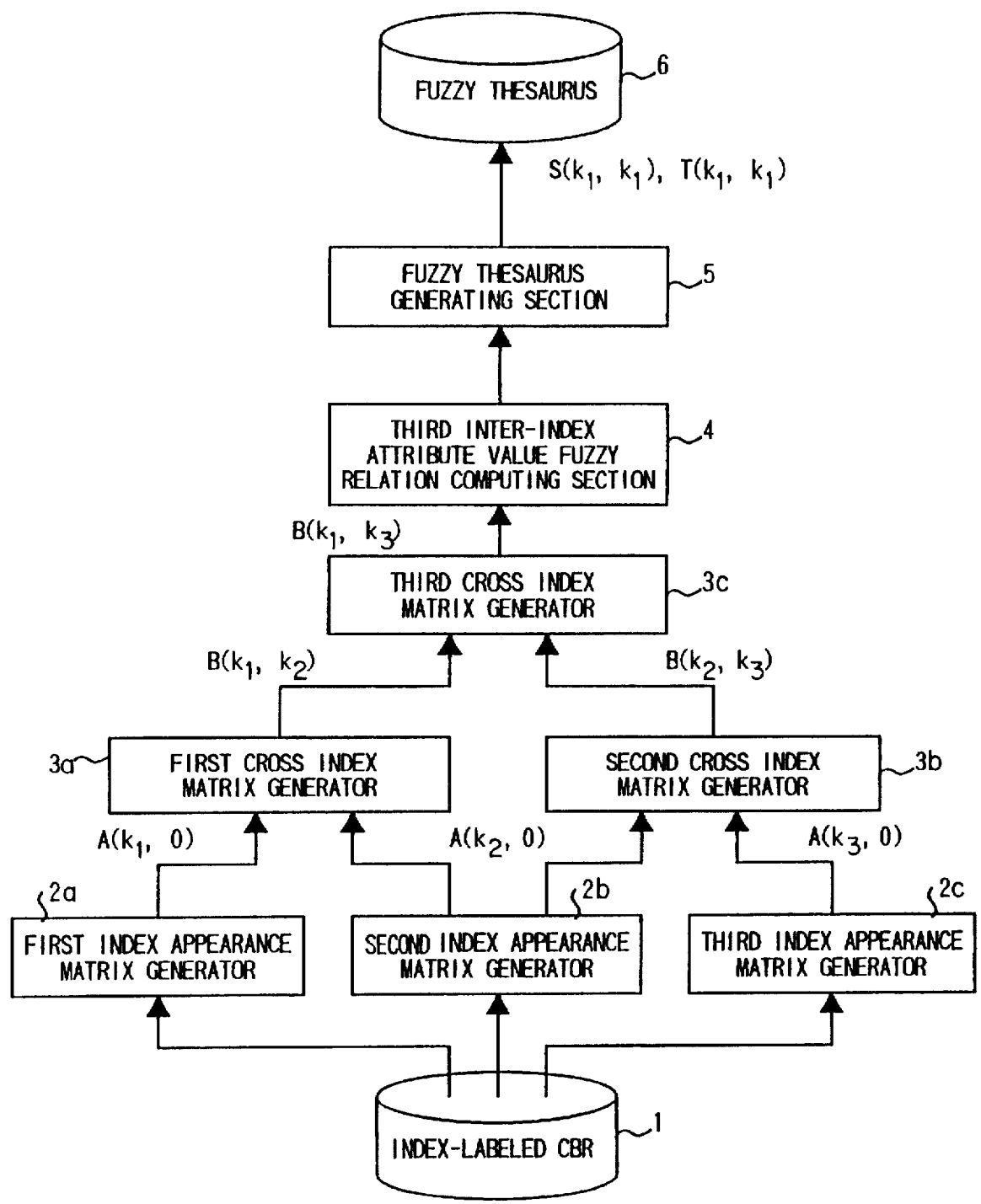

F I G. 1 2

EXAMPLE OF FUZZY BROADER TERM MATRIX

| | INDEX ATTRIBUTE VALUE IN THE INDEX $k_1$ | | | |
|---|---|---|---|---|
| | $k_1, 1$ | $k_1, 2$ | $k_1, 3$ | $k_1, 4$ |
| INDEX ATTRIBUTE VALUE IN THE INDEX $k_1$ — $k_1, 1$ | 1.0 | 0.5 | 0.0 | 0.5 |
| $k_1, 2$ | 0.0 | 1.0 | 0.0 | 0.0 |
| $k_1, 3$ | 0.33 | 1.0 | 1.0 | 0.5 |
| $k_1, 4$ | 0.0 | 0.0 | 0.0 | 1.0 |

F I G. 1 7
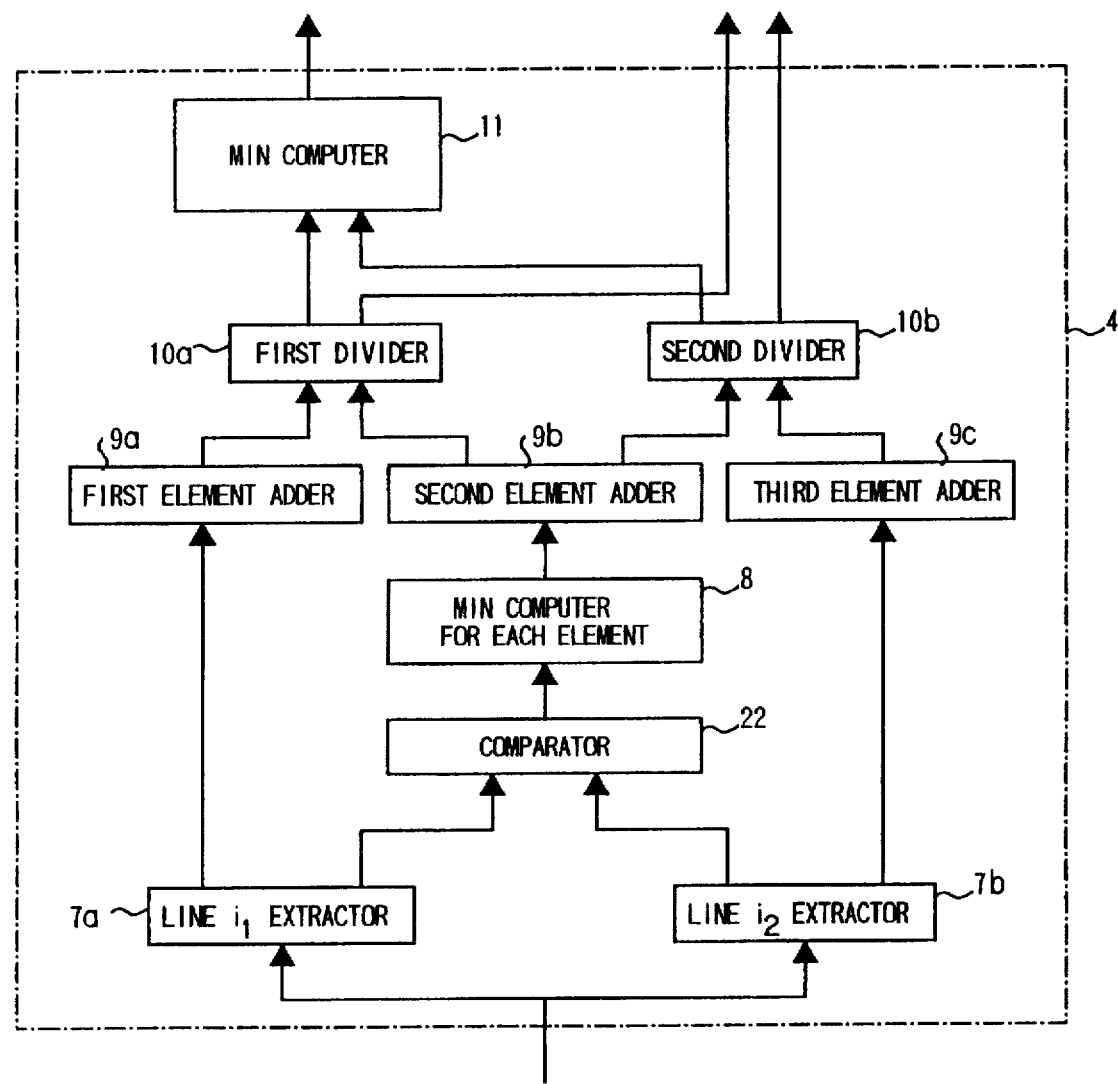

| KEYWORD \ DOCUMENT | DOCUMENT d1 | DOCUMENT d2 | DOCUMENT d3 | DOCUMENT d4 | DOCUMENT d5 |
|---|---|---|---|---|---|
| KEYWORD w1 | 2 | 3 | 1 | 0 | 0 |
| KEYWORD w2 | 0 | 5 | 6 | 3 | 1 |
| KEYWORD w3 | 4 | 1 | 3 | 5 | 5 |
| KEYWORD w4 | 1 | 0 | 2 | 0 | 4 |
| KEYWORD w5 | 3 | 3 | 0 | 4 | 5 |

FUZZY THESAURUS GENERATOR

FIELD OF THE INVENTION

The present invention relates to a fuzzy thesaurus generator for generating a fuzzy thesaurus indicating a relation between terms required in information retrieval.

BACKGROUND OF THE INVENTION

A fuzzy thesaurus indicates a relation between index attribute values for similar case retrieval, for instance, in CBR (case-based reasoning).

In the CBR as defined herein, rules are not used for reasoning, but cases which are related to the present case are retrieved from a number of past cases stored and they are applied to the present problem. Two functions of similar case retrieval and case modification are required for this CBR.

Of these two functions, as to the similar case retrieval, it is conceivable to use a fuzzy thesaurus prepared by using a generalized index for retrieval of similar cases. At first a keyword is fixed, and then a plurality of keywords are obtained for retrieval in response to this keyword according to the fuzzy thesaurus. These keywords are weighted. A data base is searched according to the keywords.

For efficiently executing retrieval of similar cases, it is important to generate an appropriate fuzzy thesaurus.

FIG. 25 is a block diagram showing a conventional type of fuzzy thesaurus generation apparatus shown in "Seminar: Fuzzy Vol.9, Fuzzy Data Base and Information Retrieval" edited by Japan Fuzzy Academy and published by Nippon Kogyo Shimbunsha, 1993.

An object of the conventional type of fuzzy thesaurus shown in FIG. 25 is to generated a fuzzy thesaurus showing a relation between keywords for document retrieval. If the fuzzy thesaurus described above is correlated to a fuzzy thesaurus indicating a relation between index attribute values for retrieval of similar cases in the CBR, a case, an index and an index attribute value used in retrieval of similar cases correspond to a document, a category of keyword (generally one category), and a keyword in document retrieval respectively.

In the block diagram in FIG. 25, the reference numeral 1 indicates a keyword-labeled document data base, and outputs a document labeled with a keyword. The reference numeral 3 indicates a keyword appearance matrix generator, which receives said keyword-labeled document and outputs a keyword appearance matrix. The reference numeral 4 indicates a inter-keyword fuzzy relation computing section, which receives said keyword appearance matrix and outputs a fuzzy relation between keywords. The reference numeral 5 indicates a fuzzy thesaurus generating section, which receives said inter-keyword fuzzy relation and outputs a fuzzy thesaurus.

The inter-keyword fuzzy relation computing section 4 comprises a line $i_1$ extractor 7a for receiving a keyword appearance matrix and outputting a value for each element in line $i_1$, a line $i_2$ extractor 7b for receiving said keyword appearance matrix and outputting a value for each element in line $i_2$, a MIN computer 8 for receiving an output from the line $i_1$ extractor 7a and an output from the line $i_2$ extractor 7b and outputting either smaller one of each element in line $i_1$ and that in line $i_2$ respectively, a first element adder 9a for receiving an output from said line $i_1$ extractor 7a and summing the elements, a second element adder 9b for receiving an output from the MIN computer for each element and summing the elements, a third element adder 9c for receiving an output from the line $i_2$ extractor 7b and summing the elements, a first divider 10a for receiving an output from said first element adder 9a and an output from second element adder 9b and executing division, a second divider 10b for receiving an output from the second element adder 9b and an output from the third element adder 9c and executing division, and a MIN computer 11 for receiving an output from the first divider 10a and an output from the second divider 10b and executing MIN computing.

Furthermore, the fuzzy thesaurus generating section 5 comprises a fuzzy broader term matrix generator 12 for receiving an inter-keyword fuzzy relation from said inter-keyword fuzzy relation computing section 4 and outputting a fuzzy thesaurus indicating a relation between broader terms and narrower terms, and a fuzzy related term matrix generator 13 for receiving the inter-keyword fuzzy relation and outputting a fuzzy thesaurus indicating a relation between related terms.

A description is made for operations of the conventional type of fuzzy thesaurus generator described above.

At first the keyword appearance matrix generator 2 receives an keyword-labeled document from an keyword-labeled document data base 1 and outputs a keyword appearance matrix shown in FIG. 26. As shown in FIG. 26, a keyword appearance matrix shows documents in each line and keywords in each row, and also shown a frequency of appearance of each keyword in each document.

The inter-keyword fuzzy relation computing section 4 receives the keyword appearance matrix and prepares and outputs a scalar indicating a fuzzy relation between keywords. Detailed description is made for operations of the inter-keyword fuzzy relation computing section 4.

The line $i_1$ extractor 7a receives the keyword appearance matrix, extracts each element in line $i_1$, and outputs a vector. The line vector indicates a frequency of appearance of the $i_1$-th keyword in each document. Similarly the line $i_2$ extractor 7b extracts each element in the $i_2$-th line and outputs a vector.

Furthermore, the MIN computer 8 for each element receives each element in the line $i_1$ and each element in line $i_2$, executes MIN computing between each element, and outputs a vector including an element having a smaller value. The line vector indicates a frequency of an event in which the $i_1$-th keyword and the $i_2$-th keyword appear simultaneously in each document.

Then the first element adder 9a receives and adds vectors outputted from the line $i_1$ extractor 9a and outputs a scalar. The scalar indicates a total number of events in which the $i_1$-th keyword appeared in the documents. Similarly the second element adder 9b receives and adds a vector outputted from the MIN computer 8 for each element and outputs a scalar. The scalar indicates a total number of events in which the $i_1$-th keyword and the $i_2$-th keyword appear simultaneously in each document. Furthermore, the third adder 9c receive and adds a vector outputted from the line $i_2$ extractor 7b and output a scalar. The scalar indicates a total number of events in which the $i_2$-th keyword appeared in the documents.

The first divider 10a receives a scalar outputted from the first element adder 9a and a scalar outputted from the second element adder 9b, divides a latter scalar by a former scalar, and outputs a scalar.

FIG. 27 shows a meaning of the division described above, indicates that a frequency of an event in which also the $i_2$-th keyword appears simultaneously when the $i_1$-th keyword appears (shadowed section shared by a frequency of appearance of the $i_1$-th keyword and that of the $i_2$-th appearance). From this figure, it can be understood that the higher a percentage of the simultaneous appearance frequency in the frequency of appearance of the $i_1$-th keyword is, the higher the possibility that the $i_1$-th keyword is a narrower concept of the $i_2$-th keyword. Similarly the second divider 10b receives a scalar outputted from the second element adder 9b and a scalar outputted from the third element adder 9c, divides a former scalar by a latter scalar, and outputs a scalar.

It can be understood that the higher value of the scalar is, the higher possibility that the $i_2$-th keyword is narrower concept of the $i_1$-th keyword.

Then the MIN computer 11 receives a scalar outputted from the first divider 10a and a scalar outputted from the second divider 10b, executes MIN computing, and outputs a scalar including a smaller value of the two above.

The fuzzy thesaurus generating section 5 comprises a fuzzy broader term matrix generator 12 and a fuzzy related term matrix generator 13, prepares the fuzzy related term matrix S ($k_1$, $K_1$) and a fuzzy broader term matrix T ($k_1$, $k_1$) according the scalar showing a fuzzy relation between keywords, and outputs the fuzzy related term matrix as well as the fuzzy broader term matrix. A description is made hereinafter the operations of the fuzzy thesaurus generating section 5.

The fuzzy broader term matrix generator 12 receives a scalar outputted from the first divider 10a as well as a scalar outputted from the second divider 10b, and as shown in FIG. 26, prepares a fuzzy broader term matrix indicating the possibility that each keyword is a broader term of each other keyword, and outputs the matrix.

Furthermore, the fuzzy related term matrix generator 13 receives a scalar outputted from the MIN computer 11, prepares a fuzzy related term matrix indicating the possibility that each keyword is a related term for each other keyword, and outputs the matrix.

The fuzzy thesaurus 6 receives and accumulates therein a fuzzy broader term matrix T ($k_1$, $k_1$) outputted from the fuzzy broader term matrix generator 12 and a fuzzy related term matrix S ($k_1$, $k_1$) outputted from the fuzzy related term matrix generator 13.

As described above, in the conventional type of fuzzy thesaurus generator, a fuzzy thesaurus is formed depending on a frequency of an event in which a plurality of keywords belonging to the same type appear simultaneously. For this reason, the problems as described below occur when applied to retrieval of similar cases in a database of cases.

1. In the CBR (case-based reasoning), as only one index attribute value corresponding to keyword exists in each index, the conventional type of fuzzy thesaurus generator based on a frequency of simultaneous appearance can not be used.

2. In the CBR (case-based reasoning), even in a case where a plurality of indexes corresponding to a plurality types of keywords exist, the data can not be used effectively.

SUMMARY OF THE INVENTION

It is an object of the present invention to obtain a fuzzy thesaurus generator for generating a fuzzy thesaurus to define a relation between index attribute values effectively making use of a plurality of index data.

As described above, with the fuzzy thesaurus generator according to the present invention, a fuzzy thesaurus generator comprises a first index appearance matrix generator for outputting a first index appearance matrix indicating a relation between a first index and a case according to an index-labeled case from an index-labeled database of cases, a second index appearance matrix generator for outputting a second index appearance matrix indicating a relation between a second index and the case according to the index-labeled case, a cross index matrix generator for outputting a cross index matrix indicating a relation between the first index and the second index according to the first index appearance matrix as well as to the second index appearance matrix, an inter-index attribute value fuzzy relation computing section for a fuzzy relation between index attribute values in the first index evaluated from the relation with the second index according to the cross index appearance matrix, and a fuzzy thesaurus generating section for outputting a fuzzy thesaurus relating to the first index according to the fuzzy relation between the index attribute values in the first index, so that a fuzzy thesaurus enabling definition of a relation between index attribute values can be generated by effectively using data for a plurality of indexes.

With the fuzzy thesaurus generator according to the present invention, the fuzzy thesaurus generator comprises a first index appearance matrix generator for outputting a first index appearance matrix indicating a relation between a first index and a case according to an index-labeled case from an index-labeled database of cases, a second index appearance matrix generator for outputting a second index appearance matrix indicating a relation between a second index and the case according to the index-labeled case, a third index appearance matrix generator for outputting a third index appearance matrix indicating a relation between a third index and the case according to the case, a first cross index matrix generator for outputting a first cross index matrix indicating a relation between the first index and the second index according to the first index appearance matrix as well as to the second index appearance matrix, a second cross index matrix generator for outputting a second cross index matrix indicating a relation between the first index and the third index according to the first index appearance matrix as well as to the third index appearance matrix, a first inter-index attribute value fuzzy relation computing section for outputting a fuzzy relation between index attribute values in the first index evaluated from a relation with the second index according to the first cross index matrix, a second inter-index attribute value fuzzy relation computing section for outputting a fuzzy relation between index attribute values in the first index evaluated from a relation with the third index according to the second cross index matrix, a first fuzzy thesaurus generating section for outputting a fuzzy thesaurus for the first index evaluated from a relation with the second index according to a fuzzy relation between index attribute values in the first index, a second fuzzy thesaurus generating section for outputting a fuzzy thesaurus for the first index evaluated from a relation with the third index according to a fuzzy relation between index attribute values in the second index, and a thesaurus unifying section for outputting a fuzzy thesaurus relating to the first index according to output from the first fuzzy thesaurus generating section as well as to output from the second thesaurus generating section, so that evaluations thereof can be executed from more sides as compared to a case where one of indexes is referred to.

With the fuzzy thesaurus generator according to the present invention, the fuzzy thesaurus generator comprises a first index appearance matrix generator for outputting a first index appearance matrix indicating a relation between a first index and a case according to an index-labeled case from an index-labeled database of cases, a second index appearance matrix generator for outputting a second index appearance matrix indicating a relation between a second index and the case according to the case, a third index appearance matrix generator for outputting a third index appearance matrix indicating a relation between a third index and the case according to the case, a first cross index matrix generator for outputting a first cross index matrix indicating a relation between the first index and the second index according to the first index appearance matrix as well as to the second index appearance matrix, a second cross index matrix generator for outputting a second cross index matrix indicating a relation between the second index and the third index according to the second index appearance matrix as well as to the third index appearance matrix, a third cross index matrix generator for outputting a third cross index matrix indicating a relation between the first index and the third index according to the first cross index matrix as well as to the second cross index matrix, an inter-index attribute value fuzzy relation computing section for outputting a relation between index attribute values in the first index according to the third cross index matrix, and a fuzzy thesaurus generating section for outputting a fuzzy thesaurus concerning the first index according to the relation between index attribute values in the first index, so that a fuzzy thesaurus in which imbalance between index attribute values is not found much can be generated by averaging values for a cross index matrix, and for this reason evaluations thereof can be executed from more sides.

With the fuzzy thesaurus generator according to the present invention, the inter-index attribute value fuzzy relation computing section comprises a first line extractor for outputting values of elements in a first line of the cross index matrix, a second line extractor for outputting values of elements in a second line of the cross index matrix, a MIN computer for each element for outputting either smaller one of the first line element and the second line element according to an output from the first line extractor and an output from the second extractor, a first element adder for summing elements in an output from the first line extractor, a second element adder for summing elements in an output from the MIN computer for each element, a third element adder for summing elements in an output from the second line extractor, a first divider for executing division according to an output from the first element adder and an output from the second element adder and outputting a result of the division, a second divider for executing division according to an output from second element adder and an output from the third element adder and outputting a result of the division, and a MIN computer for outputting either smaller one of the output from the first divider and an output from the second divider, and the fuzzy thesaurus generator comprises a fuzzy related term matrix generator for outputting a fuzzy thesaurus indicating a relation between related terms according to an output from the MIN computer, and a fuzzy broader term generator for outputting a fuzzy thesaurus indicating a relation between a broader term and a narrower term according to an output from the first divider as well as to an output from second divider, so that, by effectively using data for a plurality of indexes corresponding to keywords in a plurality of categories, and even in a case where each index has only one index attribute value corresponding to the keyword, a fuzzy thesaurus indicating a relation of a broader term and a narrower term between the index attribute values and a fuzzy thesaurus indicating a relation between related terms can be generated, and for this reason the fuzzy thesaurus can be utilized for retrieval of data having a plurality of indexes like the case described above.

With the fuzzy thesaurus generator according to the present invention, the inter-index attribute value fuzzy relation computing section comprises a convertor for converting either smaller one of an output from the first divider and an output from the second divider to zero (0) and then sending an output from the first divider and an output from the second divider respectively to the fuzzy thesaurus generating section, so that, by converting a smaller value thereof to zero (0), a fuzzy thesaurus, in which a case where some of fuzzy thesauruses does not match a personal point of view that there does not seem to be much difference between a degree of a narrower term and a degree of a broader term in a relation of a fuzzy broader term and narrower term is excluded, can be generated.

With the fuzzy thesaurus generator according to the present invention, the inter-index attribute value fuzzy relation computing section comprises a first substituter for converting, when an output value from the first line extractor is more than 1, the value to 1 and outputting the value to the first element adder, a second substituter for converting, when an output value from the MIN computer for each element described above is more than 1, the value to 1 and outputting the value to the second element adder, a and a third substituter for converting, when an output value from the second line extractor is more than 1, the value to 1 and outputting the value to the third element adder, so that a value for a cross index matrix becomes zero (0) or 1, whereby a fuzzy thesaurus in which a frequency of appearance of index attribute values is avoided from duplicately counting can be generated.

With the fuzzy thesaurus generator according to the present invention, the inter-index attribute value fuzzy relation computing section comprises a first normalizer for normalizing an output from the first line extractor and outputting the normalized value to the first element adder, a second normalizer for normalizing an output from the second line extractor and outputting the normalized value to the third element adder, and an element multiplier, in place of the MIN computer for each element described above, for multiplying elements in an output from the first normalizer as well as in an output from the second normalizer and outputting a result of multiplication to the second element adder, so that, by normalizing and multiplying elements in a cross index, such situation that a relation between index attribute values becomes closer due to high frequency of appearance thereof in spite of the fact that there is too much difference in the frequency of appearance between two elements should be avoided, and for this reason, a fuzzy thesaurus can be generated so that the smaller the difference in the frequency of appearance between two elements is, the closer the relation thereof becomes.

With the fuzzy thesaurus generator according to the present invention, the inter-index attribute value fuzzy relation computing section comprises a comparator for comparing an output value from the first line extractor to that from the second line extractor for each element, converting a value of either smaller one, when a difference between these elements is large, to zero (0), and outputting the value to the MIN computer for each element, so that, by converting a value for the frequency of simultaneous appearance, in a case where there is too much difference in the frequency of appearance between two elements, to zero (0) with the comparator, a fuzzy thesaurus can be generated so that it is regarded that there is no relation between index attribute values having too much difference in frequency of appearance between two elements. Whereby imbalance between index attribute values can be reduced.

With the fuzzy thesaurus generator according to the present invention, a zone value computer for computing a zone value for an output from the first divider as well as an output from the second divider is provided in place of the MIN computer in the inter-index attribute value fuzzy relation computing section, so that a fuzzy thesaurus in which a relation between two elements is regarded as an upper limit and a lower limit based on the frequency of simultaneous appearance thereof can be generated.

With the fuzzy thesaurus generator according to the present invention, a t-norm computer for obtaining a fuzzy AND condition for an output from the first divider as well as that from the second divider is provided in place of the MIN computer of the inter-index attribute value fuzzy relation computing section, so that, by executing t-norm computation in place of the MIN computation, a fuzzy thesaurus in which some of fuzzy AND conditions closer to human sensitivities is selected can be generated when a relation between two elements is evaluated based on the frequency of simultaneous appearance thereof.

With the fuzzy thesaurus generator according to the present invention, a t-conorm computer for obtaining a fuzzy OR condition for an output from the first divider as well as for an output from the second divider is provided in place of the MIN computer of the inter-index attribute value fuzzy relation computing section, so that, by executing t-conorm computation in place of the MIN computation, a fuzzy thesaurus in which some of fuzzy OR conditions closer to human sensitivities is selected can be generated when a relation between two elements is evaluated based on the frequency of simultaneous appearance thereof.

With the fuzzy thesaurus generator according to the present invention, the fuzzy thesaurus generator comprises a first transitive package computer for generating and outputting a transitive package according to an input of a fuzzy related term matrix from the fuzzy related term matrix generator, and a second transitive package computer for generating and outputting a transitive package according to an input of a fuzzy broader term matrix from the fuzzy broader term matrix generator, so that, by computing a transitive package after generating a fuzzy broader term matrix and a fuzzy related term matrix, a fuzzy thesaurus in which a relation between elements not evaluated directly from the frequency of simultaneous appearance thereof is also evaluated can be generated.

With the fuzzy thesaurus generator according to the present invention, the fuzzy thesaurus generator comprises a first index appearance matrix generator for outputting a first index appearance matrix indicating a relation between a first index and a case according to an index-labeled case from an index-labeled database of cases, a second index appearance matrix generator for outputting a second index appearance matrix indicating a relation between a second index and the case according to the index-labeled case, a cross index matrix generator for outputting a cross index matrix indicating a relation between the first index and the second index according to the first index appearance matrix as well as to the second index appearance matrix, and an other index reference type fuzzy thesaurus generator for outputting a fuzzy thesaurus concerning the first index according to the fuzzy thesaurus concerning the second index previously given and the cross index matrix, so that, by generating a fuzzy thesaurus based on the fuzzy thesaurus for other indexes as a reference, a fuzzy thesaurus in which a relation between index attribute values for other indexes is used can be generated.

With the fuzzy thesaurus generator according to the present invention, the fuzzy thesaurus generator comprises a first index appearance matrix generator for outputting a first index appearance matrix indicating a relation between a first index and a case according to an index-labeled case from an index-labeled database of cases, a second index appearance matrix generator for outputting a second index appearance matrix indicating a relation between a second index and the case according to the index-labeled case, a third index appearance matrix generator for outputting a third index appearance matrix indicating a relation between a third index and the case according to the index-labeled case, a first cross index matrix generator for outputting a first cross index matrix indicating a relation between the first index and the second index according to the first index appearance matrix as well as to the second index appearance matrix, a second cross index matrix generator for outputting a second cross index matrix indicating a relation between the first index and the third index according to the first index appearance matrix as well as to the third index appearance matrix, a first other index reference type fuzzy thesaurus generator for outputting a fuzzy thesaurus concerning the first index evaluated from a relation between a fuzzy thesaurus concerning the second index previously given and a fuzzy thesaurus for the second index according to the first cross index matrix, a second other index reference type fuzzy thesaurus generator for outputting a fuzzy thesaurus concerning the first index evaluated from a relation between a fuzzy thesaurus concerning the third index previously given and a fuzzy thesaurus for the third index according to the second cross index matrix, and a thesaurus unifying section for outputting a fuzzy thesaurus concerning the first index according to an output from the first other index reference type fuzzy thesaurus generator as well as to an output from the second other index reference type fuzzy thesaurus generator, so that, by generating and unifying fuzzy thesauruses based on each fuzzy thesaurus for other two indexes as a reference, a fuzzy thesaurus in which a relation between index attribute values for other index can not only be used but also averaged can be generated.

With the fuzzy thesaurus generator according to the present invention, the thesaurus unifying section comprises an average computer for averaging two matrixes inputted thereto and outputting a result of the averaging operation, so that a fuzzy thesaurus in which a relation between index attribute values is averaged can be generated.

With the fuzzy thesaurus generator according to the present invention, the thesaurus unifying section comprises a zone value computer for computing a zone value between the inputted two matrixes, so that, by computing a zone value in place of averaging a unifying method of a fuzzy thesaurus, a fuzzy thesaurus in which a relation between two elements is regarded as an upper limit and a lower limit based on the evaluation according to other discrete index can be generated.

With the fuzzy thesaurus generator according to the present invention, the thesaurus unifying section comprises a t-norm computer for obtaining a fuzzy AND condition between the inputted two matrixes, so that, by executing a t-norm computation in place of averaging a unifying method of a fuzzy thesaurus, a fuzzy thesaurus in which some of fuzzy AND conditions closer to human sensitivities is selected can be generated when a relation between two elements is evaluated based on the evaluation according to other discrete index.

With the fuzzy thesaurus generator according to the present invention, the thesaurus unifying section comprises a t-conorm computer for obtaining a fuzzy OR condition between the inputted two matrixes. so that, by executing a t-conorm computation in place of averaging a unifying method of a fuzzy thesaurus, a fuzzy thesaurus in which some of fuzzy OR conditions closer to human sensitivities is selected can be generated when a relation between two elements is evaluated based on the evaluation according to other discrete index.

Other objects and features of this invention will become understood from the following description with reference to the accompanying drawings.

BRIEF DESCRIPTION OF DRAWINGS

FIG. 2 is a graph showing an index $k_1$ appearance matrix A ($k_1$, 0) according to the present invention;

FIG. 3 is a graph showing an index $k_2$ appearance matrix A ($k_2$, 0) according to the present invention;

FIG. 4 is a graph showing a cross index matrix according to the present invention;

FIG. 5 is a graph showing a fuzzy broader term matrix according to the present invention;

FIG. 6 is a graph showing a fuzzy related term matrix according to the present invention;

FIG. 7 is a block diagram showing Embodiment 2 according to the present invention;

FIG. 8 is a block diagram showing Embodiment 3 according to the present invention;

FIG. 12 is a graph showing a fuzzy broader matrix according to Embodiment 6 of the present invention;

FIG. 17 is a block diagram showing Embodiment 11 according to the present invention;

DESCRIPTION OF THE PREFERRED EMBODIMENTS

A description is made hereinafter for several embodiments of the present application with reference to drawings.

Each fuzzy thesaurus generator concerning these embodiments generates a fuzzy thesaurus from the plural index-loaded cases by computing a fuzzy relation between indexes according to the cross index matrix indicating a relation between an index $k_1$ and an index $k_2$ generated from an appearance matrix of index $k_1$ and an appearance matrix of index $k_2$.

Figure 1:
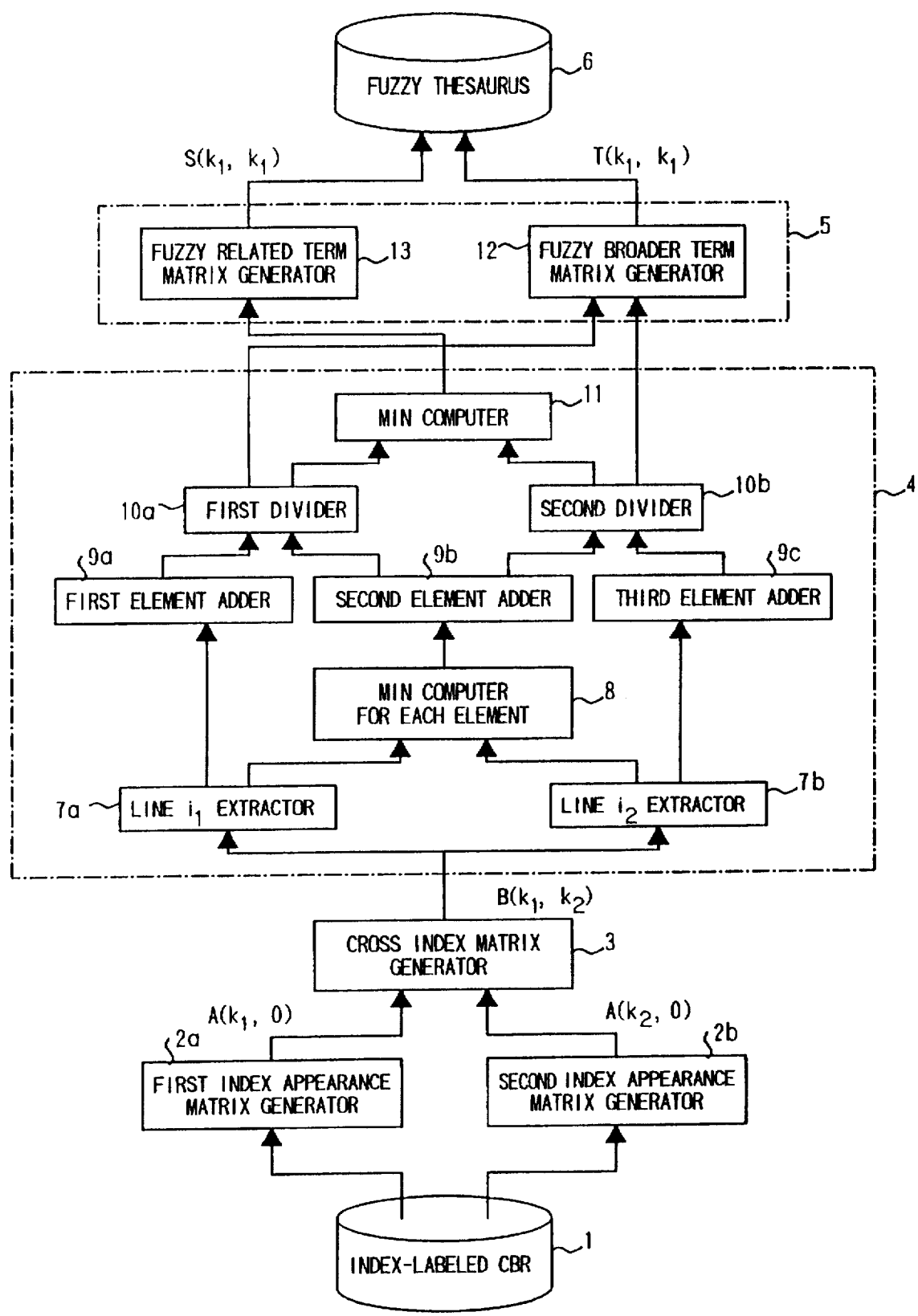
FIG. 1 is a block diagram showing Embodiment 1 according to the present invention.

FIG. 1 is a block diagram showing a fuzzy thesaurus generator according to Embodiment 1 of the present invention. In this figure, the reference numeral 1 is an index-labeled database of cases, which outputs index-labeled case data. The reference numeral 2a indicates a first index appearance matrix generator, which receives the index-labeled case data and generates a first index appearance matrix ($k_1$, 0). The reference numeral 2b indicates a second index appearance matrix generator, which receives the index-labeled case data and generates a second index appearance matrix A ($k_2$, 0). The reference numeral 3 indicates a cross index matrix generator, which generates a cross index matrix B ($k_1$, $k_2$) according to the first index appearance matrix A ($k_1$, 0) as well as to the second index appearance matrix A ($k_2$, 0). The reference numeral 4 indicates an inter-index attribute value fuzzy relation computing section, which outputs an inter-index fuzzy relation according to the cross index matrix B ($k_1$, $k_2$). The reference numeral 5 indicates a fuzzy thesaurus generating section, which generates a fuzzy related term matrix S ($k_1$, $k_1$) and a fuzzy broader term matrix T ($k_1$, $k_1$) according to the inter-index fuzzy relation, and outputs them to the fuzzy thesaurus 6.

The inter-index attribute value fuzzy relation computing section 4 comprises a line $i_1$ extractor 7a which extracts and outputs each element in line $i_1$ of the cross index matrix B ($k_1$, $k_2$), a line $i_2$ extractor 7b which extracts and outputs each element in line $i_2$ of the cross index matrix B ($k_1$, $k_2$), a MIN computer 8 for each element which executes comparison between output from the line $i_1$ extractor 7a and output from the line $i_2$ extractor 7b for each element and outputs either smaller value, a first element adder 9a which adds each element in output from the line $i_1$ extractor 7a, a third element adder 9c which adds each element in output from the line $i_2$ extractor 7b, a second element adder 9b which adds each element in output from the MIN computer 8 for each element, a first divider 10a which executes division with an output from the first element adder 9a and that from the second element adder 9b, a second divider 10b which executes division with an output from the second element adder 9b and that from the third element adder 9c, and a MIN computer 11 which executes comparison between an output from the first divider 10a and that from the second divider 10b, and outputs either smaller value.

The fuzzy thesaurus generating section 5 comprises a fuzzy broader term matrix generator 12 which outputs a fuzzy thesaurus indicating a relation between a broader term and a narrower term according to an output from the first divider 10a as well as the second divider 10b, and a related term matrix generator 13 which outputs a fuzzy thesaurus indicating a relation between related terms according to an output from the MIN computer 11.

Next, a description is made for operations in this embodiment. At first, the index-labeled database of cases 1 stores therein index-labeled case data.

The first index appearance matrix generator 2a receives index-labeled case data from the index-labeled database of cases 1, and outputs the index $k_1$ appearance matrix A ($k_1$, 0), for instance, as shown in FIG. 2. In the appearance matrix A ($k_1$, 0) shown in FIG. 2, as the index $k_1$, 1 for a value of an index in the index $k_1$ is labeled to the case $k_0$, 1, the (1, 1)-th element is 1. Also as the index $k_1$, 1 is not labeled to the case $k_0$, 2, the (1, 2)-th element is 0.

The second index appearance matrix generator 2b receives index-labeled case data from the index-labeled database of cases 1, and outputs the index $k_2$ appearance matrix A ($k_2$, 0), for instance, as shown in FIG. 3. In the appearance matrix A ($k_2$, 0) shown in FIG. 3, the index $k_2$, 1 for an attribute value of an index for the index $k_2$ is labeled to the case $k_0$, 1, so that the (1, 1)-th element is 1. Also, the index $k_2$, 1 is labeled to the case $k_0$, 2, so that the (1, 2)-th element is 1. However, as the index $k_2$, 1 is not labeled to the case $k_0$, 3, the (1, 3)-th element is 0.

Then, the cross index appearance matrix generator 3 executes the following computing according to the appearance matrix A ($k_1$, 0) of the index $k_1$ from the first index appearance matrix generator 2a as well as to the appearance matrix A ($k_2$, 0) of the index $k_2$ from the second index appearance matrix generator 2b, and generates a cross index appearance matrix B ($k_1$, $k_2$).

$$B(k_1, k_2) = A(k_1, 0)A(k_2, 0)^T \quad (1)$$

wherein T, which is a superscript for the matrix above, indicates a transposition of the matrix.

FIG. 4 shows an example of the cross index appearance matrix B ($k_1$, $k_2$) obtained from the above expression (1) using the examples shown in FIG. 2 and FIG. 3. The cross index appearance matrix B ($k_1$, $k_2$) shown in FIG. 4 is described in the line for index $k_1$, i by obtaining a frequency of simultaneous appearance of the index attribute value $k_1$, i for the index $k_1$ and the index attribute index value $k_2$, i in the case $k_0$, i (i=1, . . . , 11) from the index $k_1$ appearance matrix ($k_1$, 0) in FIG. 2 and the index $k_2$ appearance matrix A ($k_2$, 0) shown in FIG. 3.

The inter-index attribute value fuzzy relation computing section 4 receives the cross index appearance matrix B ($k_1$, $k_2$), generates a scalar indicating a fuzzy relation between index attribute values, and outputs the scalar to the fuzzy thesaurus generating section 5.

Next, a description is made for minute descriptions of the inter-index attribute value fuzzy relation computing section 4.

The line $i_1$ extractor 7a receives the cross index appearance matrix, extracts each element in the line $i_1$, and outputs it as a vector. The line vector indicates a frequency of appearance of the $i_1$-th index in the index $k_1$ to each index attribute value in the index $k_2$. Similarly, the line $i_2$ extractor 7b receives the cross index appearance matrix, extracts each element in the line $i_2$, and outputs it as a vector.

The MIN computer 8 for each element receives each element in the line $i_1$ and each element in the line $i_2$, executes MIN computing between elements corresponding to each other, and outputs a vector including either smaller value as an element. The line vector indicates a frequency of an event in which the $i_1$-th index attribute value in the index $k_1$ and $i_2$-th index attribute value appear simultaneously with an identical value of each index in the index $k_2$.

The first element adder 9a receives a vector outputted from the line $i_1$ extractor 7a, adds elements in this vector, and outputs a result of addition as a scalar. The scalar indicates a total number of times when an attribute value for the $i_1$-th index in the index $k_1$ appeared.

Similarly the second element adder 9b receives a vector outputted from the MIN computer 8 for each element described above, adds elements in this vector, and outputs a result of addition as a scalar. The scalar indicates a total number of event in which an attribute value for the $i_1$-th index in the index $k_1$ and an attribute value for the $i_2$-th index in the index $k_1$ appeared simultaneously with an identical value of each index in the index $k_2$.

Furthermore, the third element adder 9a receives a vector outputted from said line $i_2$ extractor 7b, adds elements in this vector, and outputs a result of addition as a scalar. The scalar indicates a total number of times when the attribute value for the $i_2$-th index in the index $k_1$ appeared.

The first divider 10a receives a scalar outputted from the first element adder 9a and a scalar outputted from the second element adder 9b, divides the latter scalar by the former scalar ((Output from the second element adder 9b)÷(Output from the first element adder 9a)), and outputs a result of division as a scalar.

Through the division above, a ratio of simultaneous appearance of the $i_1$-th index attribute value for the index $k_1$ with the $i_2$-th index attribute value against the total frequency can be obtained. It can be interpreted that the higher the ratio is, the possibility that the $i_1$-th index attribute value in the index $k_1$ is a narrower concept for the $i_2$-th index attribute value is the higher.

Similarly the second divider 10b receives a scalar outputted from the second element adder 9b and a scalar outputted from the third element adder 9c, divides the former scalar by the latter scalar ((Output from the second element adder 9b)÷(Output from the third element adder 9c)), and outputs a result of division as a scalar.

It can be interpreted that the higher the scalar is, the higher the possibility that the $i_2$-th index attribute value for the index $k_1$ is a narrower concept for the $i_1$-th index attribute value is.

The MIN computer 11 receives a scalar outputted from the first divider 10a and a scalar outputted from the second divider 10b, executes MIN computing, and outputs a scalar having either smaller value of the two.

The description is made for operations of the fuzzy thesaurus generating section 5.

The fuzzy thesaurus generating section 5 receives a scalar indicating a fuzzy relation between index attribute values, prepares a fuzzy related term matrix and a fuzzy broader term matrix, and outputs them to the fuzzy thesaurus 6. Next detailed description is made for operations of the fuzzy thesaurus generating section 5.

The fuzzy broader term matrix generator 12 receives a scalar outputted from the first divider 10a and a scalar outputted from the second divider 10b, prepares a fuzzy broader term matrix T ($k_1$, $k_1$) indicating the possibility that each index attribute value for the index $k_1$ is also a broader term for each index attribute value for the index $k_1$, and outputs the matrix T to the fuzzy thesaurus. An example of the fuzzy broader term matrix is shown in FIG. 5.

Furthermore, the fuzzy related term matrix generator 13 receives a scalar outputted from the MIN computer 11, prepares a fuzzy related term matrix S ($k_1$, $k_1$) indicating the possibility that each index attribute value for the index $k_1$ is also a related term of each index attribute value for the index $k_1$, and outputs the matrix S to the fuzzy thesaurus 6. An example of the fuzzy related term matrix is shown in FIG. 6.

The fuzzy thesaurus 6 receives a fuzzy broader term matrix outputted from the fuzzy broader term matrix generator 12 and a fuzzy related term matrix outputted from the fuzzy related term generator 13, and stores them therein.

As described above, with the fuzzy thesaurus generator according to Embodiment 1 of the present invention, a cross index matrix is obtained from an appearance matrix for the first index $k_1$ and an appearance matrix for the second index $k_2$, and a fuzzy thesaurus is generated according to the matrix, so that it is possible to generate a fuzzy thesaurus for the first index $k_1$ as a target referring to the second index $k_2$. For this reason, a relation between index attribute values can be defined using data for a plurality of indexes.

Because of the configuration as described above, by appropriately selecting the second index $k_2$ as a reference index, a relation between index attribute values can be evaluated according to a particular purpose in use (a particular sense for value). For instance, in reasoning with database of cases for a plan for dispatching personnel to a site of disaster to make a determination as to what types of activity are required for the site, data retrieval using a thesaurus relating to types of disaster is effective. By generating the thesaurus using the activity index as a reference index, even if, for instance, a large fire and an earthquake are different types of natural disaster, many similar activities such as search, restoration, or surveillance are required in the two cases, so that it can be determined that the two cases are rather closely related for a purpose in use such as deciding required activities (a sense for value). In other words, with the fuzzy thesaurus according to Embodiment 1 of the present invention, by appropriately selecting an index for reference, necessary countermeasures can immediately and accurately be decided for a type of disaster such as "severe disaster", even if it is "Tidal wave" or "earthquake".

FIG. 7 is a block diagram showing a fuzzy thesaurus generator according to the Embodiment 2. In the figure, reference numerals 2a, 2b and 2c are a first index appearance matrix generator, a second index appearance matrix generator, and a third index appearance matrix generator respectively. Reference numerals 3a and 3b therein are a first cross index matrix generator, and a second cross index matrix generator respectively. Reference numerals 4a and 4b are a first inter-index attribute value fuzzy relation computing section and a second inter-index attribute value fuzzy relation computing section respectively. And reference numerals 5a and 5b are a first fuzzy thesaurus generator and a second fuzzy thesaurus generator respectively. The components described above are the same as those or corresponding portions thereto shown in FIG. 1.

The reference numeral 15 indicates a thesaurus unifying section for receiving output $S_1$ ($k_1$, $k_1$), $T_1$ ($k_1$, $k_1$) from the first fuzzy thesaurus generator and output $S_2$ ($k_1$, $k_1$), $T_2$ ($k_1$, $k_1$) from the second fuzzy thesaurus generator, and for outputting these output as one fuzzy thesaurus. The thesaurus unifying section 15 comprises an average computer 14 for each of elements for averaging for each element between output $S_1$ ($k_1$, $k_1$), $T_1$ ($k_1$, $k_1$) and output $S_2$ ($k_1$, $k_1$), $T_2$ ($k_1$, $k_1$).

Next, a description is made for operations. The first index appearance matrix generator 2a receives an index-labeled case data from an index-labeled database of cases 1 and outputs an appearance matrix A ($k_1$, 0) for an index $k_1$. The second index appearance matrix generator 2b receives an index-labeled case data from the index-labeled database of cases 1 and outputs an appearance matrix A ($k_2$, 0) for an index $k_2$. Also the third index appearance matrix generator 2c receives an index-labeled case data from the index-labeled database of cases 1 and outputs an appearance matrix A ($k_3$, 0) for an index $k_3$.

These index appearance matrixes A ($k_1$, 0), A ($k_2$, 0), and A ($k_3$, 0) are like those in FIG. 2 or FIG. 3, and each index value for each index corresponds to each line respectively, each case corresponds to each raw, and a numeral value 1 is written in each matrix if the index value is added to the case, and a numeral value 0 is written therein respectively if the index value is not added thereto.

Then, the first cross index matrix generator 3a receives the appearance matrix A ($k_1$, 0) for index $k_1$ from the first index appearance matrix generator 2a and the appearance matrix A ($k_2$, 0) for index $k_3$ from the second index appearance matrix generator 2b and outputs a cross index matrix generator B ($k_1$, $k_2$).

The second cross index matrix generator 3b receives the appearance matrix A ($k_1$, 0) for index $k_1$ from the first index appearance matrix generator 2a and the appearance matrix A ($k_3$, 0) for index $k_2$ from the third index appearance matrix generator 2c and outputs a cross index matrix generator B ($k_1$, $k_3$).

These cross index matrix generators B ($k_1$, $k_2$) and B ($k_1$, $k_3$) are like that in FIG. 4, and each index value for the index $k_1$ corresponds to each line, and each index value for the index $k_2$ or $k_3$ corresponds to each raw, and frequency in which both of the index values in each line and each raw appear simultaneously is written therein.

Then, the first inter-index attribute value fuzzy relation computing section 4a receives a cross index matrix B ($k_1$, $k_2$) from the first cross index matrix generator 3a, and outputs scalar indicating relation between the first inter-index attribute values.

The second inter-index attribute value fuzzy relation computing section 4b receives a cross index matrix B ($k_1$, $k_3$) from the second cross index matrix generator 3b, and outputs scalar indicating relation between the second inter-index attribute values.

Then the first fuzzy thesaurus generator 5a receives the scalar indicating fuzzy relation between the first inter-index attribute values from the first inter-index attribute value fuzzy relation computing section 4a, and outputs a first fuzzy broader term matrix $S_1$ ($k_1$, $k_1$) and a first fuzzy related term matrix $T_1$ ($k_1$, $k_1$).

The second fuzzy thesaurus generator 5b receives the scalar indicating fuzzy relation between the second inter-index attribute values from the second inter-index attribute value fuzzy relation computing section 4b, and outputs a second fuzzy broader term matrix $S_2$ ($k_1$, $k_1$) and a second fuzzy related term matrix $T_2$ ($k_1$, $k_1$).

The fuzzy thesaurus unifying section 15 comprises an average computers 14 for each of elements. The average computer 14 for element receives a first fuzzy broader term matrix $S_1$ ($k_1$, $k_1$) and a second fuzzy broader term matrix $S_2$ ($k_1$, $k_1$) from the first fuzzy thesaurus generator section 5a and the second fuzzy thesaurus generator section 5b respectively, and processing is executed thereto according to the following expression, then a fuzzy broader term matrix S ($k_1$, $k_1$) is outputted.

$$S(k_1, k_1) = (\tfrac{1}{2})(S_1(k_1, k_1) + (S_2(k_1, k_1)) \tag{2}$$

The average computer 14 for element receives a first fuzzy related term matrix $T_1$ ($k_1$, $k_1$) and a second fuzzy related term matrix $T_2$ ($k_1$, $k_1$) from the first fuzzy thesaurus generator section 5a and the second fuzzy thesaurus generator section 5b respectively, and processing is executed thereto according to the following expression, then a fuzzy related term matrix T ($k_1$, $k_1$) is outputted.

$$T(k_1, k_1) = (\tfrac{1}{2})(T_1(k_1, k_1) + T_2(k_1, k_1)) \quad (3)$$

As described above, with the Embodiment 2, a fuzzy thesaurus for a first index $k_1$ which is a target can be generated with reference to a plurality of indexes $k_2$ and $k_3$. Accordingly as compared to a case where one index is referred to, a fuzzy thesaurus becomes possible to be evaluated from more-sided point of view.

FIG. 8 is a block diagram showing a fuzzy thesaurus generator according to the Embodiment 3. In the figure, reference numerals 3a, 3b, 3c are a first cross index matrix generator, a second cross index matrix generator, and a third cross index matrix generator respectively.

The first to third index appearance matrix generators 2a to 2c, an inter-index attribute value fuzzy relation computing section 4, a fuzzy thesaurus generator section 5, and a fuzzy thesaurus 6 each indicate the same as those or corresponding portions thereto shown in FIG. 7.

Next, a description is made for operations. The first index appearance matrix generator 2a receives an index-labeled case data from an index-labeled database of cases 1, and outputs an appearance matrix A ($k_1$, 0) for an index $k_1$.

The second index appearance matrix generator 2b receives an index-labeled case data from the index-labeled database of cases 1, and outputs an appearance matrix A ($k_2$, 0) for an index $k_2$.

The third index appearance matrix generator 2c receives an index-labeled case data from the index-labeled database of cases 1, and outputs an appearance matrix A ($k_3$, 0) for an index $k_3$.

Then the first cross index matrix generator 3a receives an appearance matrix A ($k_1$, 0) for an index $k_1$ and an appearance matrix A ($k_2$, 0) for an index $k_2$ each from the first index appearance matrix generator 2a and the second index appearance matrix generator 2b respectively, and prepares and outputs a cross index appearance matrix B ($k_1$, $k_2$).

The second cross index matrix generator 3b receives an appearance matrix A ($k_2$, 0) for an index $k_2$ and an appearance matrix A ($k_3$, 0) for a index $k_3$ from the second index appearance matrix generator 2b and the third index appearance matrix generator 2c respectively, and prepares and outputs a cross index appearance matrix B ($k_2$, $k_3$).

The third cross index matrix generator 3c receives the cross index matrix B ($k_1$, $k_2$) and the cross index matrix B ($k_2$, $k_3$) from the first cross index matrix generator 3a and the second index matrix generator 3b respectively, and prepares and outputs a cross index appearance matrix B ($k_1$, $k_3$).

Operations executed based on the cross index matrix B ($k_1$, $k_3$) for the inter-index attribute value fuzzy relation computing section 4 as well as for the fuzzy thesaurus generating section 5 are the same as those in Embodiment 1, so that description of the operations is omitted herein.

According to the fuzzy thesaurus generator in Embodiment 3, the same effect as that in a case of Embodiment 2 can be obtained.

Figure 9:
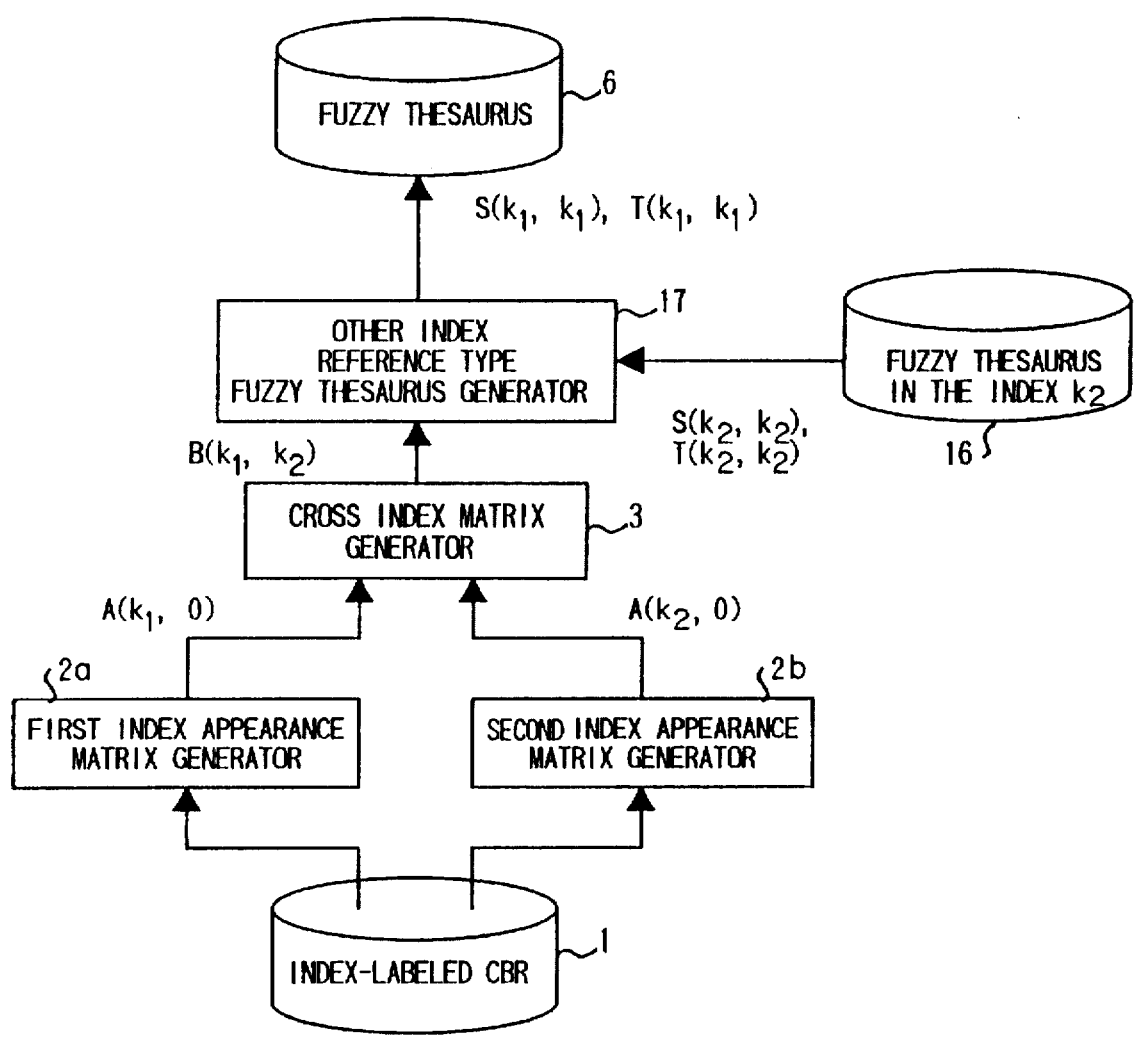
FIG. 9 is a block diagram showing Embodiment 4 according to the present invention.

FIG. 9 is a block diagram showing a fuzzy thesaurus generator according to the Embodiment 4. In the figure, designated at the reference numeral an in a fuzzy thesaurus for an index $k_2$ previously given, and at 17 an other index reference type fuzzy thesaurus generator. Other components are the same as those or corresponding portions thereto in a case of Embodiment 1.

Next, a description is made for operations.

The cross index matrix generator 3 outputs the cross index matrix B ($k_1$, $k_2$) by processing like in a case of Embodiment 1.

The other index reference fuzzy type thesaurus generator 17 receives a fuzzy broader term matrix S ($k_2$, $k_2$) and a fuzzy related term matrix T ($k_2$, $k_2$) for the index $k_2$ from the fuzzy thesaurus 16 for the index $k_2$, and further receives the cross index matrix B ($k_1$, $k_2$) from the cross index matrix generator 3, executes processing shown in the following expression, generates and outputs a fuzzy broader term matrix S ($k_1$, $k_1$) and a fuzzy related term matrix T ($k_1$, $k_1$) for the index $k_1$.

$$S(k_1, k_1) = B(k_1, k_2) \, S(k_2, k_2) \, B(k_1, k_2)^T \quad (4)$$

$$T(k_1, k_1) = B(k_1, k_2) \, T(k_2, k_2) \, B(k_1, k_2)^T \quad (5)$$

Herein, T provided on the right shoulder of each matrix described above means transposition of the matrix.

With the Embodiment 4, a fuzzy thesaurus is generated by using a well known fuzzy thesaurus concerning other index, so that, even an index is one in which a relation between inter-index attribute values according to a cross appearance matrix is difficult to be evaluated due to some reasons such as imbalance in assignment of index values thereto, a fuzzy thesaurus with no imbalance thereof can be generated.

Figure 10:
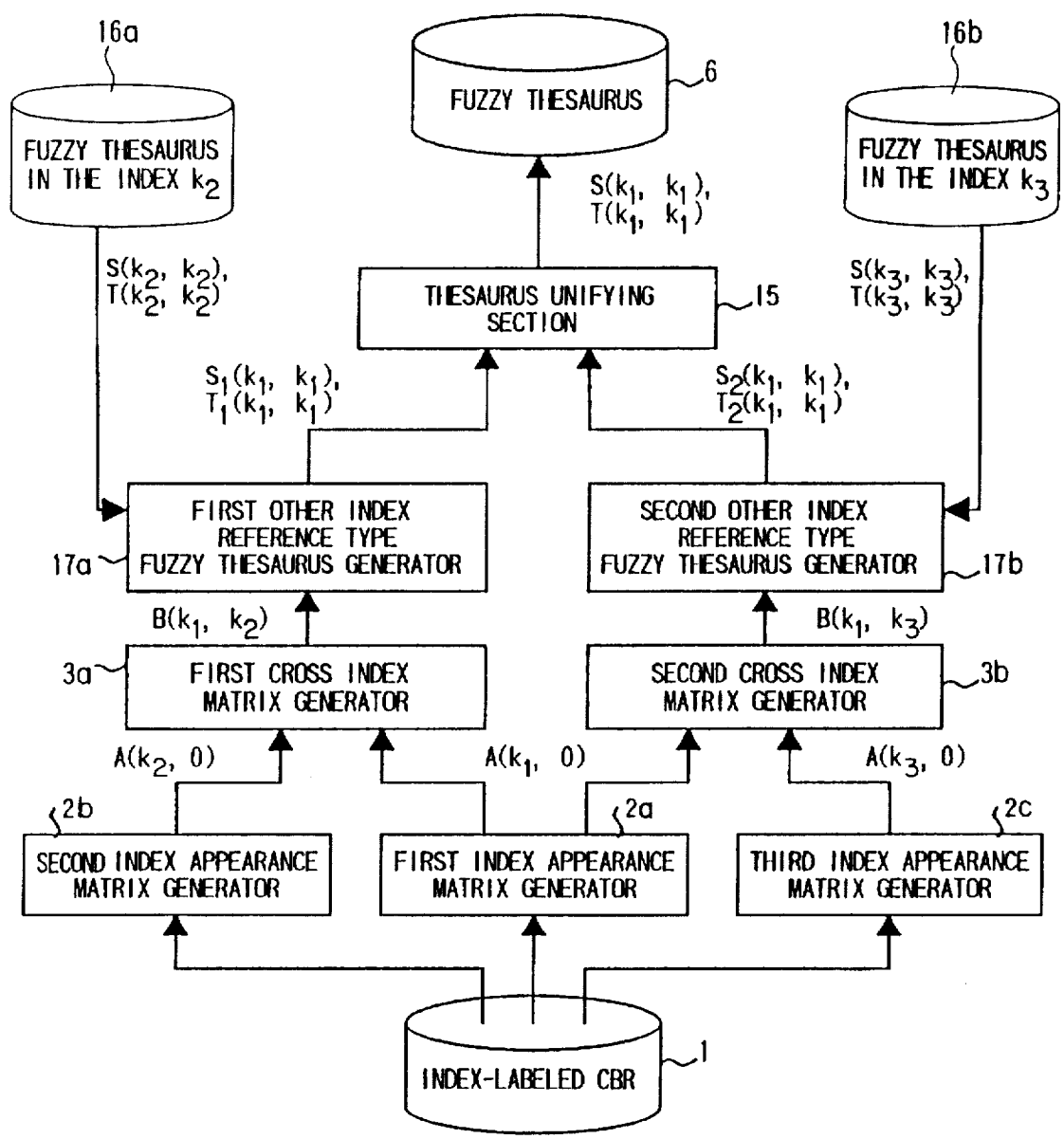
FIG. 10 is a block diagram showing Embodiment 5 according to the present invention.

FIG. 10 is a block diagram showing a fuzzy thesaurus generator according to Embodiment 5. In the figure, reference numerals 16a and 16b indicate a fuzzy thesaurus for the index $k_2$ and a fuzzy thesaurus for the index $k_3$ respectively. Reference numerals 17a and 17b indicate the first other index reference type fuzzy thesaurus generator and the second other index reference type fuzzy thesaurus generator respectively. An output from the other index reference type fuzzy thesaurus generator 17a and an output for the second other index reference type fuzzy thesaurus generator 17b are unified in the thesaurus unifying section 15, and then a result of the unification is outputted to the fuzzy thesaurus 6.

Also the index-labeled database of cases 1 to the fuzzy thesaurus 6 are the same as those or corresponding portions thereto shown in Embodiment 1.

Next, a description is made for operations. The first other index reference type fuzzy thesaurus generator 17a receives a fuzzy related term matrix S ($k_2$, $k_2$) and a fuzzy broader term matrix T ($k_2$, $k_2$) for the index $k_2$ from the fuzzy thesaurus 16a for the index $k_2$ previously given, and further receives a cross index matrix $B_1$ ($k_1$, $k_2$) from the first cross index matrix generator 3a, and outputs a fuzzy related term matrix $S_1$ ($k_1$, $k_1$) and a fuzzy broader term matrix $T_1$ ($k_1$, $k_1$) for the index $k_1$. Concrete contents for processing are the same as those in a case of Embodiment 4.

The second other index reference type fuzzy thesaurus generator 17b receives a fuzzy related term matrix S ($k_3$, $k_3$) and a fuzzy broader term matrix T ($k_3$, $k_3$) for the index $k_3$ from the fuzzy thesaurus 16b for the stored index $k_3$, and further receives a cross index matrix $B_2$ ($k_1$, $k_3$) from the second cross index matrix generator 3b, and outputs a fuzzy related term matrix $S_2$ ($k_1$, $k_1$) and a fuzzy broader term matrix $T_2$ ($k_1$, $k_1$) for the index $k_1$. Concrete contents for processing are the same as those in a case of Embodiment 4.

The thesaurus unifying section 15 receives a fuzzy related term matrix $S_1$ ($k_1$, $k_1$) and a fuzzy broader term matrix $T_1$ ($k_1$, $k_1$) for the index $k_1$ from the first other index reference type fuzzy thesaurus generator 17a, and further receives a fuzzy related term matrix $S_2$ ($k_1$, $k_1$) and a fuzzy broader term matrix $T_2$ ($k_1$, $k_1$) from the second other index reference type fuzzy thesaurus generator 17b, and prepares a fuzzy related term matrix S ($k_1$, $k_1$) and a fuzzy broader term matrix T ($k_1$, $k_1$) for the index $k_1$, and outputs the matrixes. Concrete contents for processing are the same as those in a case of Embodiment 2.

In accordance with the Embodiment 5, the same effect as those in Embodiment 2 as well as Embodiment 4 can be obtained.

Figure 11:
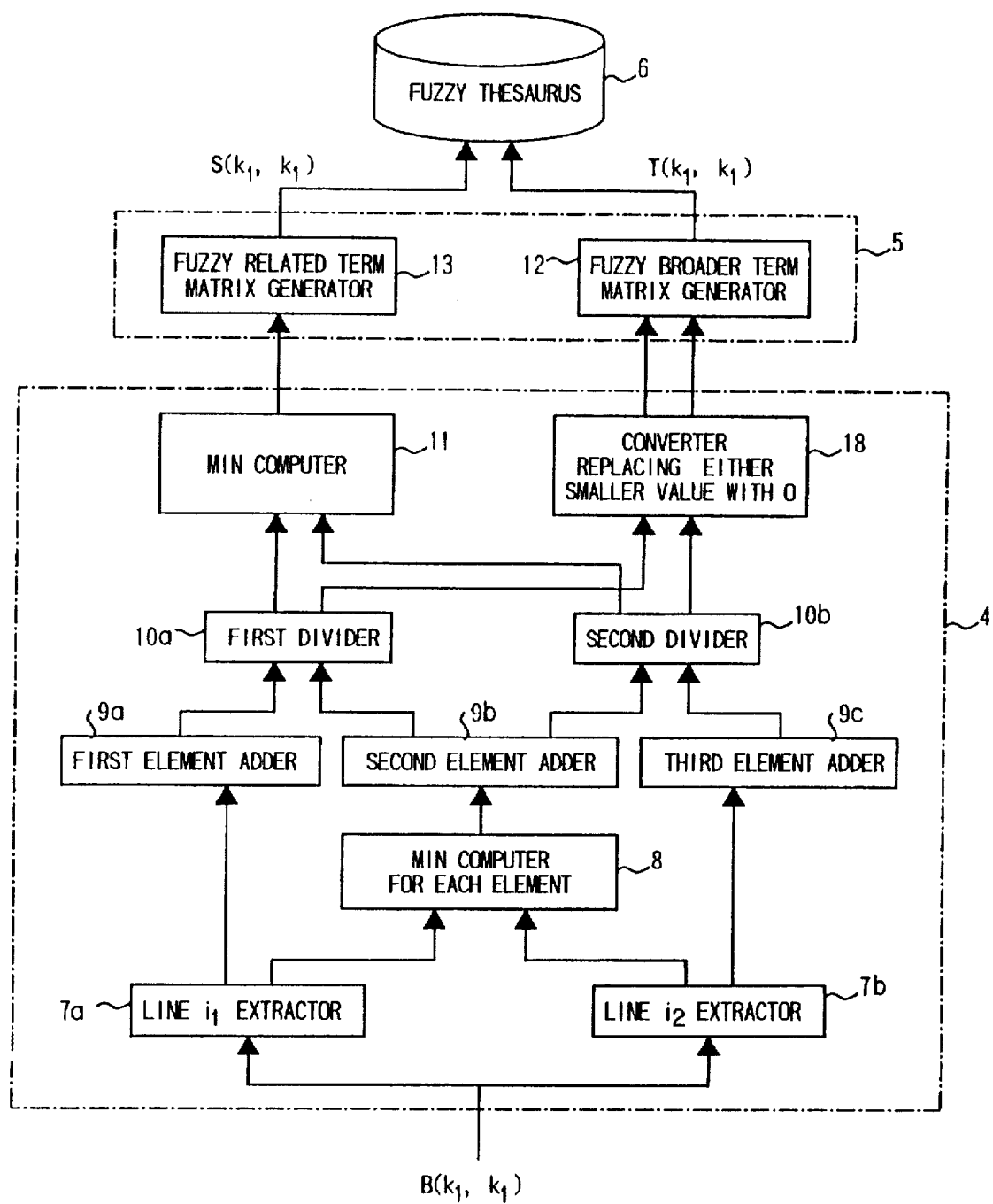
FIG. 11 is a block diagram showing Embodiment 6 according to the present invention.

FIG. 11 is a block diagram showing an fuzzy thesaurus generator according to Embodiment 6 of the present invention. In this figure, the reference numeral 18 indicates a convertor which replaces either smaller one of two scalars inputted thereinto with zero (0). The other components are the same as those shown in FIG. 1.

Next, a description is made for operations.

The convertor 18, which replaces either smaller one of two scalars inputted therein with zero (0) receives a scalar outputted from the first divider 10a and a scalar outputted from the second divider 10b, compares the scalars to each other, replaces either smaller value with zero (0), and outputs the value. For instance, in a case where the cross index matrix B ($k_1$, $k_1$) shown in FIG. 4 is inputted into the inter-index attribute value fuzzy relation computing section 4, the fuzzy broader term matrix T ($k_1$, $k_1$) for the index $k_1$ outputted from the fuzzy broader term matrix generator 12 is as shown in FIG. 12. The matrix shown in FIG. 12 is different from the matrix in a case where the convertor replacing either smaller value with zero (0) is not included, in the point that several elements are converted to zero (0).

By the way, in a case where the convertor 18 does not exist, sometimes a phenomenon occurs that, in a broader term matrix generated by the fuzzy broader term matrix generator 12, the possibility of being a narrower term is not so different from the possibility of being a broader term. This means that, in a case where there are two pieces of index; index A and index B, A is a narrower term to B and at the same time B is a narrower term of A. This contradicts to reasonability understandable to us. However, if the convertor 18 is provided therein, either one of the outputs from the dividers 10a, 10b is compulsively changed to zero (0), the contradiction as described above does not occur.

As described above, in the Embodiment 6, there is provided a convertor which compulsively replaces either smaller one of outputs from two dividers with zero (0), it is possible to prevent occurrence of contradiction such as that, in a relation between a fuzzy broader term and a narrower term, the possibility of being a narrower term is not so different from the possibility of being a broader term. With this feature, a natural fuzzy thesaurus can be generated.

Figure 13:
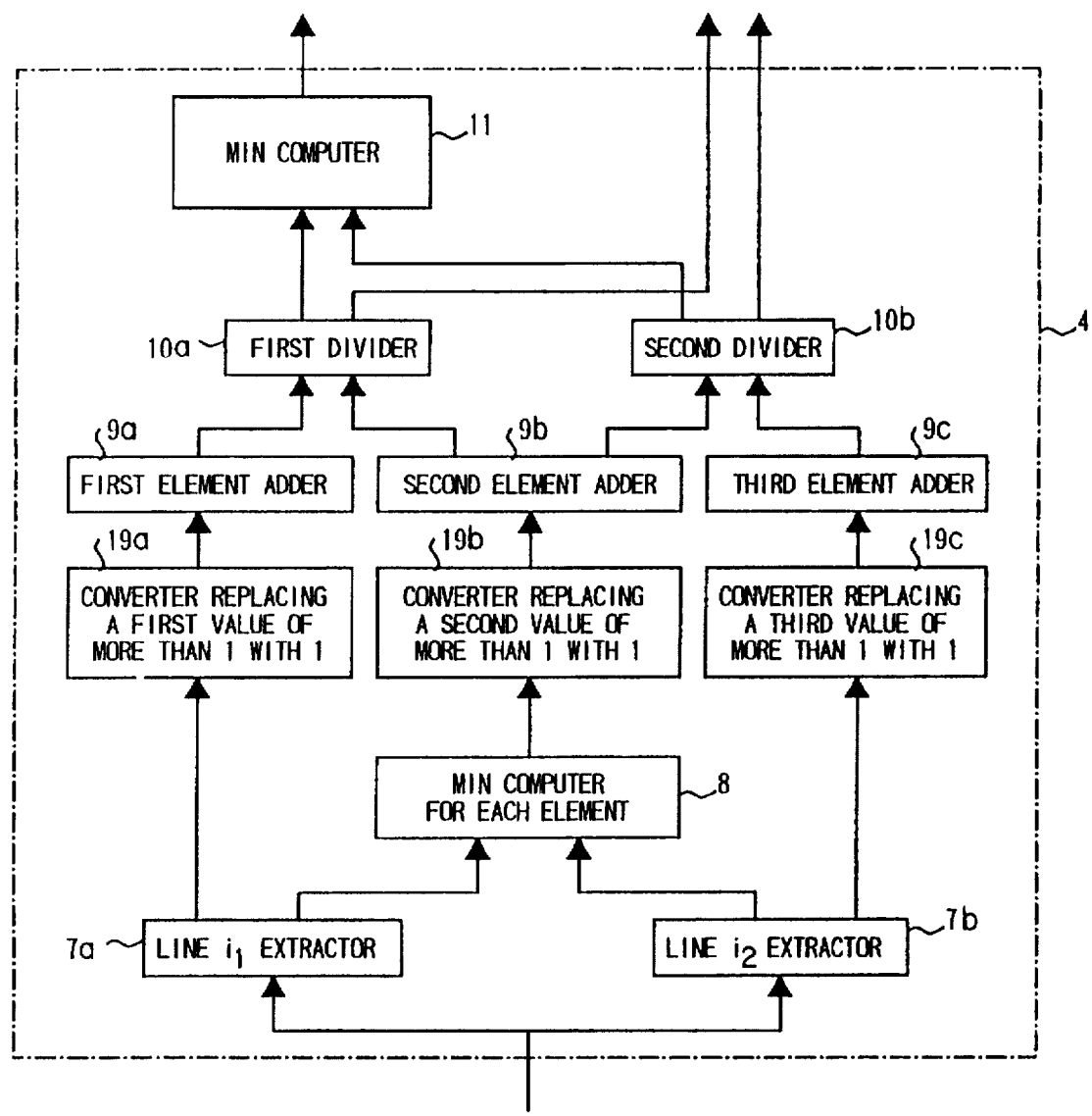
FIG. 13 is a block diagram showing Embodiment 7 according to the present invention.

A convertor, which replaces a value of more than 1 with one (1), may be provided in the inter-index attribute value fuzzy relation computing sections 4. FIG. 13 is a block diagram showing a fuzzy thesaurus generator according to Embodiment 7 of the present invention. In this figure, the reference numerals 19a, 19b, 19c indicates convertors which replace a first value of more than 1 with 1, a second value of more than 1 with 1, and a third value of more than 1 with 1 respectively.

Next, a description is made for operations in the embodiment. The convertor 19a which replaces a first value of more than 1 with 1 receives a vector extracting line $i_1$ of a cross index matrix from the line $i_1$ extractor 7a, replaces a value of each element in the vector, if it is more than 1, with 1, and outputs the value.

The convertor 19b, which replaces a second value of more than 1 with 1, receives a vector outputted from the MIN computer 8 for each element, replaces a value of each element in the vector, if it is more than 1, with 1, and outputs the value.

The convertor 19c, which replaces a third value of more than 1 with 1, receives a vector extracting line $i_2$ of the cross index matrix from the line $i_2$ extractor 7b, replaces a value of each element in the vector, if it is more than 1, with 1, and outputs the value.

By the way, each element in the cross index matrix indicates a frequency of appearance of an index attribute value, so that the elements are integers of 0, 1, 2, 3, and on. The convertors 19a to 19c replace any of integers more than 1 with 1. For this reason, a value of any element in the cross index matrix is either 0 or 1.

As described above, in this Embodiment 7, there is provided a convertor which replaces a value of each element in a vector, if it is more than 1, with 1 and outputs the value, so that any value for a cross index is replaced with either 0 or 1. With this feature, a fuzzy thesaurus including no duplicated count for a frequency of appearance of an index attribute value can be generated.

Embodiment 6 and Embodiment 7 may be combined with each other.

Figure 14:
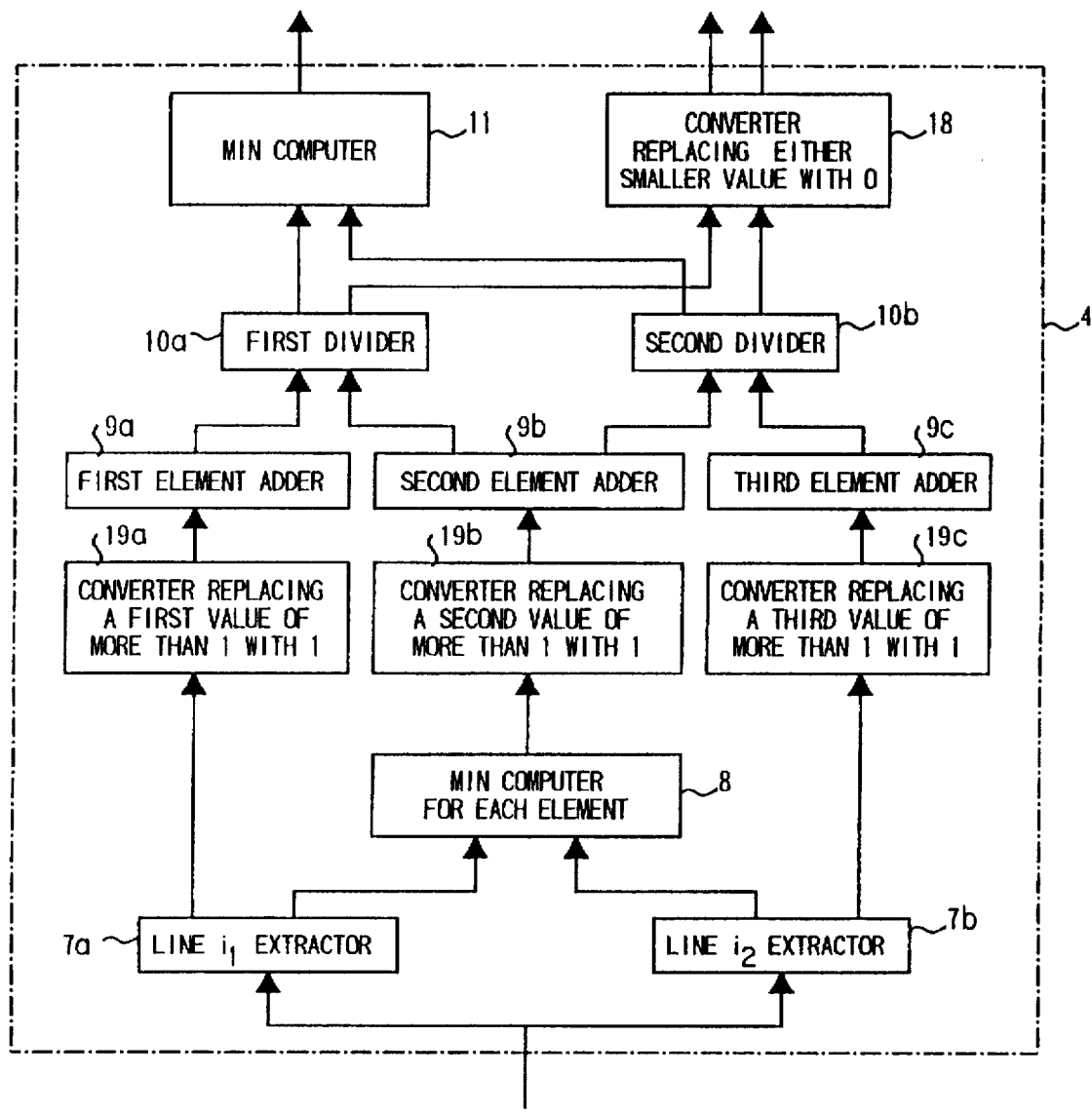
FIG. 14 is a block diagram showing Embodiment 8 according to the present invention.

FIG. 14 is a block diagram showing a fuzzy thesaurus generator according to this Embodiment 8. In this figure, the reference numerals 18 indicates a convertor which replaces either smaller value with zero (0), while the convertors 19a, 19b, 19c indicate convertors which replace a first value of more than 1 with 1, a second value of more than 1 with 1, and a third value of more than 1 with 1, respectively.

Next, a description is made for operations in this embodiment. The convertor 19a, which replaces a first value of more than 1 with 1, receives a vector extracting line $i_1$ of a cross index matrix from the line $i_1$ extractor 7, replaces a value of each element in the vector, if it is more than 1, with 1, and outputs the value.

The convertor 19b, which replaces a second value of more than 1 with 1, receives a vector outputted from the MIN computer 8 for each element, replaces a value of each element in the vector, if it is more than 1, with 1, and outputs the value.

The convertor 19c, which replaces a third value of more than 1 with 1, receives a vector extracting line $i_2$ of the cross index matrix from the line $i_2$ extractor 7b, replaces a value of each value in the vector, if it is more than 1, with 1, and outputs the value.

The convertor 18, which replaces either smaller value with 0, receives a scalar outputted from the first divider 10a as well as a scalar outputted from the second divider 10b, compares the values to each other, replaces either smaller one with 0, and outputs the value.

As described above, in the Embodiment 6 of the present invention, there are provided a convertor which replaces either smaller one of outputs from two divider with 0, and convertors which replace a value of each element in a vector, if it is more than 1, with 1, and output the value, so that the same effects as those provided in Embodiments 6 and 7 can be achieved.

Figure 15:
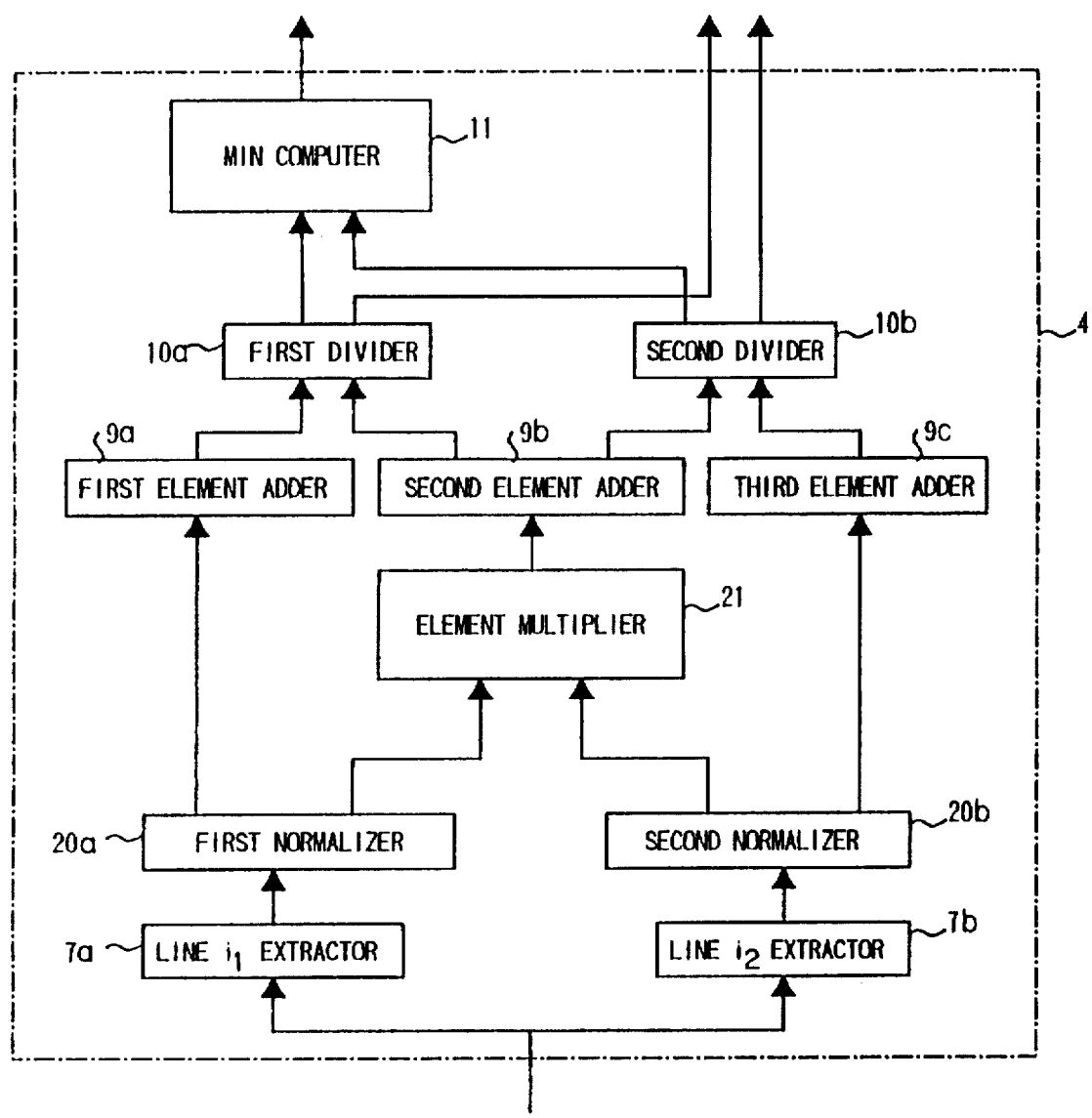
FIG. 15 is a block diagram showing Embodiment 9 according to the present invention.

FIG. 15 is a block diagram showing a fuzzy thesaurus generator according to Embodiment 9 of the present invention. In this figure, the reference numerals 20a, 20b indicate a first normalizer and a second normalizer respectively. The reference numeral 21 indicates an element multiplier provided in place of the MIN computer 8 for each element.

Next, a description is made for operations in this embodiment. The first normalizer 20a receives a vector outputted from the line $i_1$ extractor 7a, normalizes each element in the vector, and outputs the normalized value to the first element adder 9a as well as to the element multiplier 21. The second normalizer 20b receives a vector outputted from the line $i_2$ extractor 7b, normalizes each element in the vector, and outputs the normalized values to the third element adder 9c as well as to the element multiplier 21.

The element multiplier 21 executes multiplication for each pair of corresponding elements between a normalized vector outputted from the first normalizer 20a and a normalized vector outputted from the second normalizer 20b.

As described above, in this Embodiment 9, there are provided a first normalizer and a second normalizer which normalize a cross index matrix as well as an element multiplier which executes multiplication of normalized vectors, so that it is possible to generate a fuzzy thesaurus in which a relation between frequencies of appearance of two elements with a smaller difference becomes closer.

With this feature, it is possible to evade a case where, although a difference between frequencies of appearance of two elements is extremely large, the frequencies are so high that the relation between the index attribute values become closer.

Embodiment 6 and Embodiment 9 each described above may be combined with each other.

Figure 16:
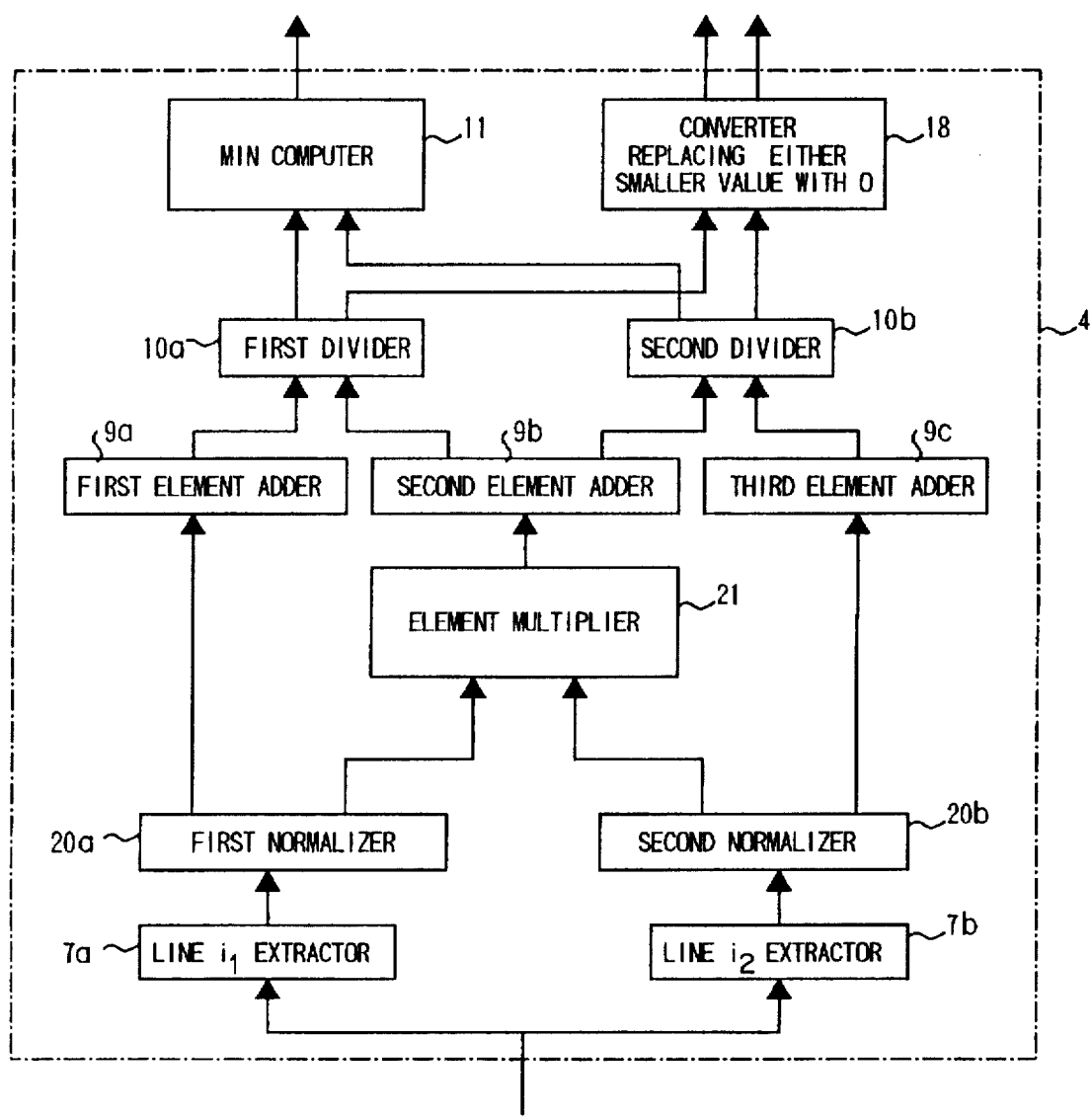
FIG. 16 is a block diagram showing Embodiment 10 according to the present invention.

FIG. 16 is a block diagram showing a fuzzy thesaurus generator according to Embodiment 10 of the present invention. In this figure, the reference numeral 18 indicates a convertor which replaces either smaller value with zero (0), the reference numerals 20a, 20b indicate a first normalizer and a second normalizer respectively, and the reference numeral 21 indicates an element multiplier.

Next, a description is made for operations in this embodiment. The first normalizer 20a receives a vector outputted from the line $i_1$ extractor 7, normalizes each element in the vector, and outputs the normalized values. The second normalizer 20b receives a vector outputted from the line $i_2$ extractor 7, normalizes each element in the vector, and outputs the normalized values.

Then the element multipliers 21 receives normalized vectors for each pair of corresponding elements from the first normalizer 20a and the second normalizer 20b, executes multiplication between the vectors, and outputs the products.

The convertor 18, which replaces either smaller value with zero (0), receives a scalar outputted from the first divider 10a and a scalar outputted from the second divider 10b, compares the values to each other, replaces either smaller value with zero (0), and outputs the value.

As described above, in this Embodiment 10, there are provided a convertor which replaces either smaller one of outputs from two dividers with zero (0), a first normalizer and a second normalizer which normalize a vector, and an element multiplier which executes multiplication between normalized vectors, so that the same effects as those provided in Embodiment 6 and Embodiment 9 can be achieved.

FIG. 17 is a block diagram showing a fuzzy thesaurus generator according to Embodiment 11 of the present invention. In this figure, the reference numeral 22 indicates a comparator.

Next, a description is made for operations in this embodiment. The comparator 22 receives a vector outputted from the line $i_1$ extractor 7a and a vector outputted from the line $i_2$ extractor 7b, and compares corresponding elements to each other. If a difference between the two values is large, the comparator prepares a vector with the smaller value converted to 0, and outputs each vector to the MIN computer 8 for each element.

As described above, in Embodiment 11, there is provided a comparator which compares corresponding elements to each other, and prepares a vector, if a difference between two values is large, with the smaller one converted to 0, and for this reason it is possible to generate a fuzzy thesaurus so that imbalance will not be generated between index attribute values having an extremely large difference in frequencies of appearance of two elements by converting with 0 with the frequency of simultaneous appearance in a case where a difference in frequencies of appearance of two elements is extremely large, which improves the statistical reliability.

For instance, in a case where a frequency of appearance of index A is several tens and a frequency of appearance of index B is 1, there is no possibility that, although the index B should be determined as a narrower term (or a broader term), it is incorrectly determined as a broader term (or a narrower term) after it appears only once.

Figure 18:
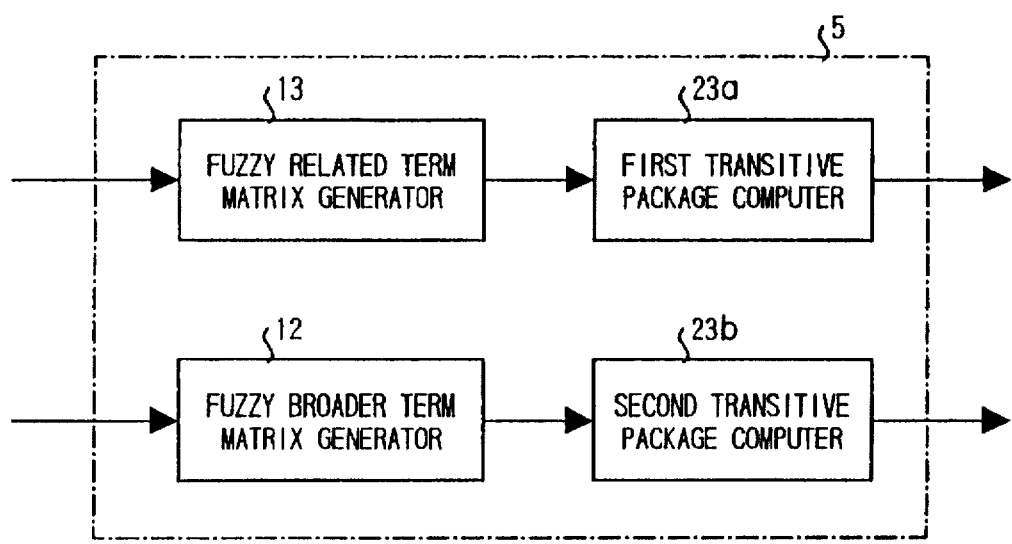
FIG. 18 is a block diagram showing Embodiment 12 according to the present invention.

FIG. 18 is a block diagram showing configuration of a fuzzy thesaurus generating section in the fuzzy thesaurus generator according to Embodiment 12 of the present invention. In this figure, the fuzzy thesaurus generator 5 comprises, in addition to the fuzzy broader term matrix generator 12 and a fuzzy related term matrix generator 13, a first transitive package computer 23a and a second transitive package computer 23b.

Next, a description is made for operations in this embodiment. The first transitive package computer 23a receives a fuzzy related term matrix S ($k_1$, $k_1$) from the fuzzy related term matrix generator 13, executes the processing as indicated by the following equation, and then outputs the result of processing as a transitive package $S_{TC}$ ($k_1$, $k_1$) for the fuzzy related term matrix.

$$S_{TC}(k_1, K_1)=S(k_1, k_1)\cup S(k_1, k_1)^2\cup S(k_1, k_1)^3 \ldots \cup S(k_1, k_1)^n \quad (6)$$

wherein n is a number of index attribute values.

The second transitive package computer 23b receives a fuzzy broader term matrix T ($k_1$, $k_1$) from the fuzzy broader term matrix generator 12, executes the processing as indicated by the following equation, and outputs a result of the processing as a fuzzy broader term matrix $T_{TC}$ ($k_1$, $k_1$).

$$T_{TC}(k_1, k_1)=T(k_1, k_1)\cup T(k_1, k_1)^2\cup (k_1, k_1)^3 \ldots T(k_1, k_1)^n \quad (7)$$

Herein n indicates a number of index attribute values.

As described above, in Embodiment 12, there are furthermore provided a first transitive package and a second transitive package in the fuzzy thesaurus generating section, so that it is possible to generate a fuzzy thesaurus in which a relation between elements not having been directly evaluated from a frequency of simultaneous appearance is evaluated.

A zone value computer may be provided in place of an MIN computer of an inter-index attribute value computing section.

Figure 19:
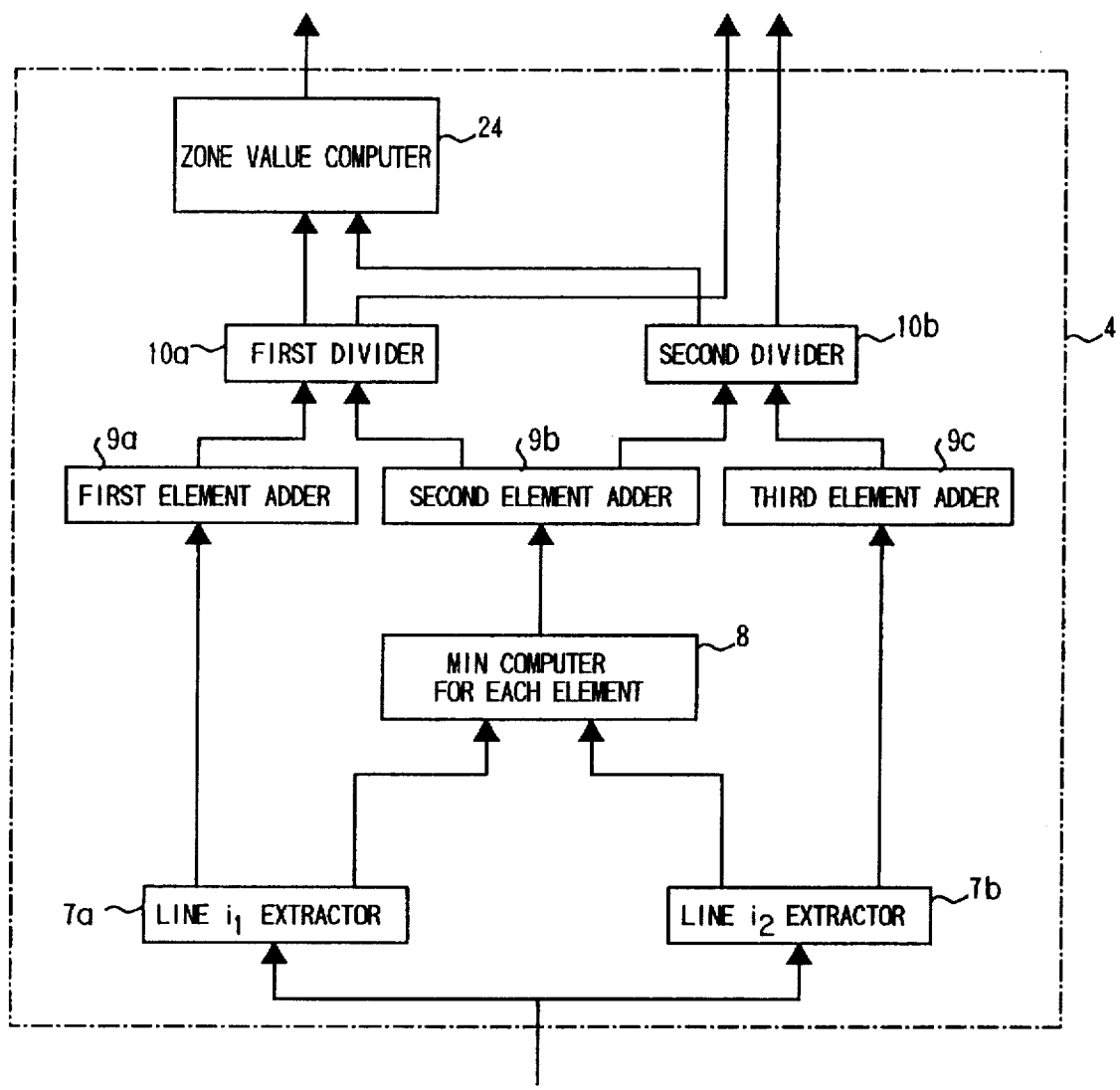
FIG. 19 is a block diagram showing Embodiment 13 according to the present invention.

FIG. 19 is a block diagram showing the inter-index attribute value fuzzy relation computing section in the fuzzy thesaurus generator according to Embodiment 13 of the present invention. In this figure, the reference numeral 24 indicates a zone value computer.

Next, a description is made for operations in this embodiment. The zone value computer 24 receives a scalar outputted from the first divider 10a and a scalar outputted from the second divider 10b, executes the processing as indicated by the following expression, and outputs a result of the processing.

$$[x_1, x_2, \ldots, x_n]*[y_1, y_2, \ldots, y_n]=[|x_1 \wedge y_1|, |x_2 \wedge y_2|, \ldots, |x_n \wedge y_n|] \quad (8)$$

Herein n indicates a number of index attribute values.

As described above, in the Embodiment 13, there is provided a zone value computer in place of a MIN computer of an inter-index attribute value fuzzy relation computing section, so that it is possible to generate a fuzzy thesaurus in which a relation between two elements is defined with an upper limit and a lower limit according to a relation in simultaneous appearance.

Figure 20:
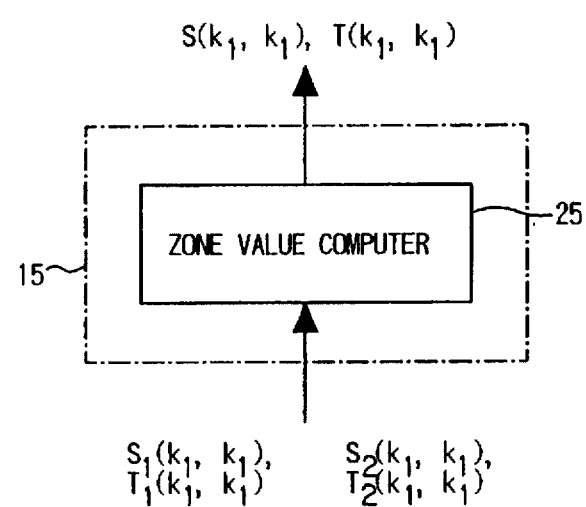
FIG. 20 is a block diagram showing Embodiment 14 according to the present invention.

FIG. 20 is a block diagram showing configuration of a fuzzy thesaurus unifying section in the fuzzy thesaurus generator according to Embodiment 14 of the present invention. In the figure, the fuzzy thesaurus unifying section 15 comprises the zone value computer 25.

Next, a description is made for operations in this embodiment. The zone value computer 25 in the fuzzy thesaurus unifying section 15 receives two fuzzy related term matrixes $S_1$ ($k_1$, $k_1$) and $S_2$ ($k_1$, $k_1$), executes the processing as indicated by the expression (8) above, and outputs a fuzzy related term matrix $S$ ($k_1$, $k_1$).

The zone value computer 25 in the fuzzy thesaurus unifying section 15 also receives two fuzzy broader term matrixes $T_1$($k_1$, $k_1$) and $T_2$ ($k_1$, $k_1$), executes the processing as indicates by the expression (8) above, and outputs a fuzzy broader term matrix $T$ ($k_1$, $k_1$).

As described above, in the Embodiment 14, the thesaurus unifying section comprises a zone value computer, so that it is possible to generate a fuzzy thesaurus in which a relation between two elements is defined as an upper limit and a lower limit based on evaluation of other discrete indexes.

A t-norm computer may be provided in place of a MIN computer of an inter-index attribute value fuzzy relation computing section.

Figure 21:
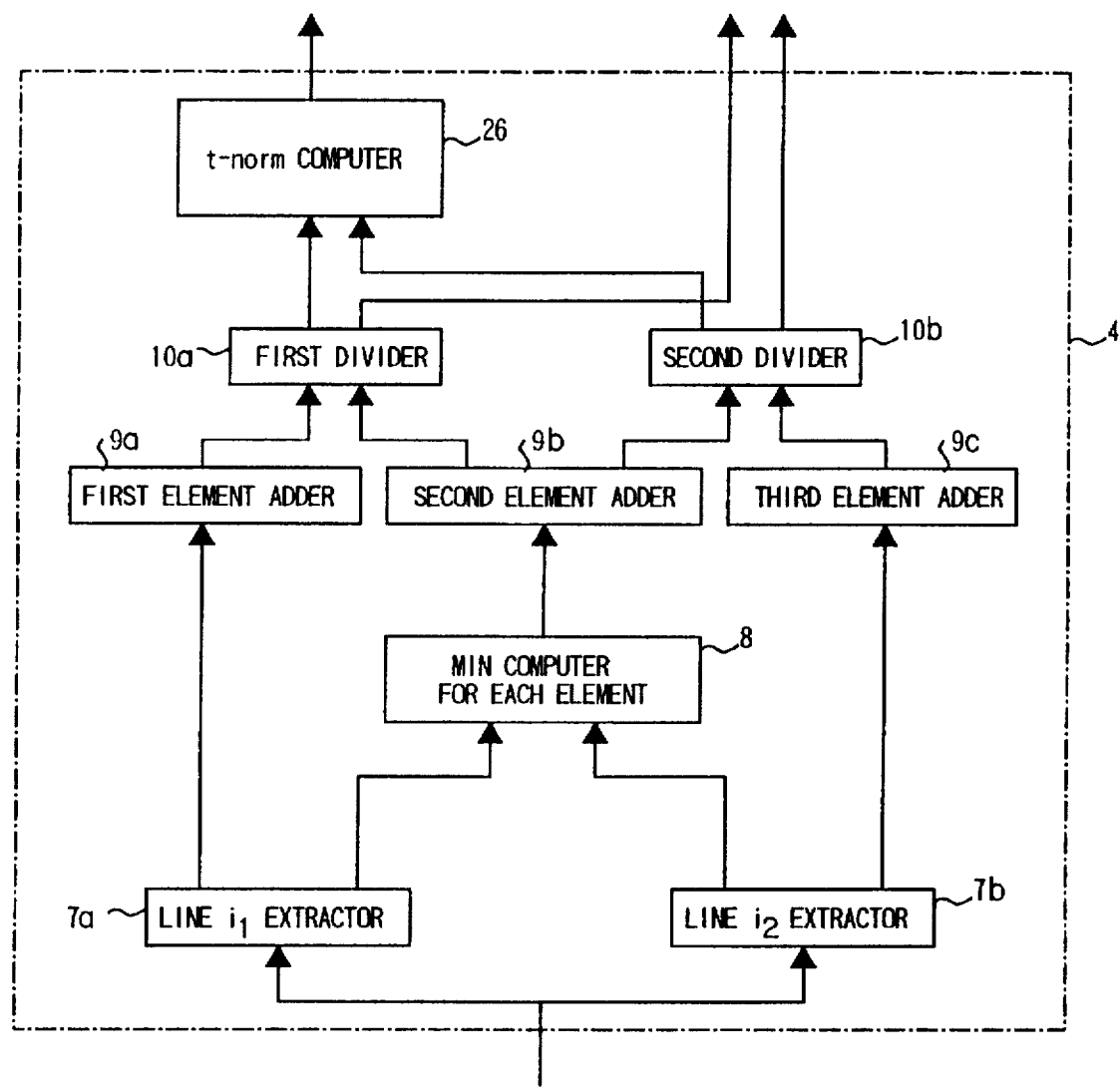
FIG. 21 is a block diagram showing Embodiment 15 according to the present invention.

FIG. 21 is a block diagram showing a fuzzy thesaurus generator according to Embodiment of the present invention. In the figure, the reference numeral 26 indicates a t-norm computer.

Next, a description is made for operations in this embodiment. The t-norm computer 26 receives a scalar outputted from the first divider 10a and a scalar outputted from the second divider 10b, executes the processing as indicated by the following expression, and outputs a result of the processing. The processing provides fuzzy AND condition, and the characteristics changes according to how a parameter p is set.

$$T(x,y) = 1 - (1 - \wedge^p \sqrt{(1-x)^p + (1-y)^p}\,); 0 < p < \infty \qquad (9)$$

As described above, in the Embodiment 15, there is provided a t-norm computer in place of a MIN computer of an inter-index attribute value fuzzy relation computing section, so that it is possible to generate a fuzzy thesaurus by computing which can effectively respond to many types of index and is closer to human sensitivity.

A fuzzy thesaurus unifying section of a fuzzy thesaurus generator may comprise a t-norm computer.

Figure 22:
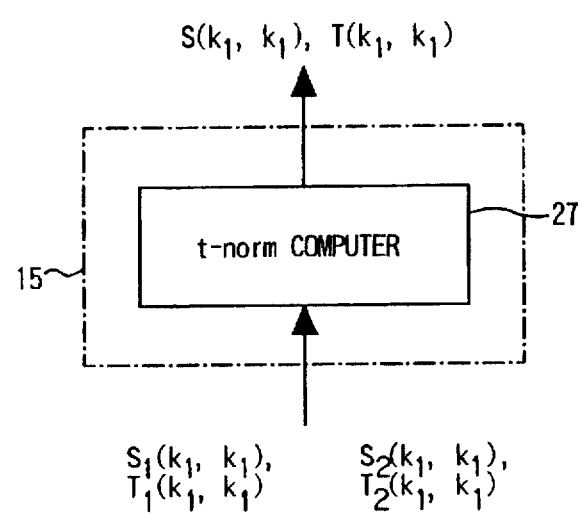
FIG. 22 is a block diagram showing Embodiment 16 according to the present invention.

FIG. 22 is a block diagram showing a fuzzy thesaurus generator according to Embodiment 16 of the present invention.

Next, a description is made for operations in the embodiment. The t-norm computer 27 in the fuzzy thesaurus unifying section 15 receives two fuzzy related term matrixes $S_1$ ($k_1$, $k_1$) and $S_2$ ($k_1$, $k_1$), executes the processing as indicates by the above expression (9), and outputs a fuzzy related term matrix $S$ ($k_1$, $k_1$). The processing indicates fuzzy AND condition, but the characteristics changes according to how the parameter p is set.

The t-norm computer 27 in the fuzzy thesaurus unifying section 15 receives two fuzzy broader term matrixes $T_1$ ($k_1$, $k_1$) and $T_2$ ($k_1$, $k_1$), executes the processing as indicated by the expression (9), and outputs a fuzzy broader term matrix $T$ ($k_1$, $k_1$). This processing indicates fuzzy AND condition, but the characteristics changes according to how the parameter p is set.

As described above, in the Embodiment 16, the thesaurus unifying section comprises a t-norm computer, so that it is possible to generate a fuzzy thesaurus by computing which can effectively respond to many types of index and is closer to human sensitivity, when a relation between two elements is evaluated according to evaluation of other discrete indexes.

A t-conorm computer may be provided in place of a MIN computer of an inter-index attribute value fuzzy relation computing section.

Figure 23:
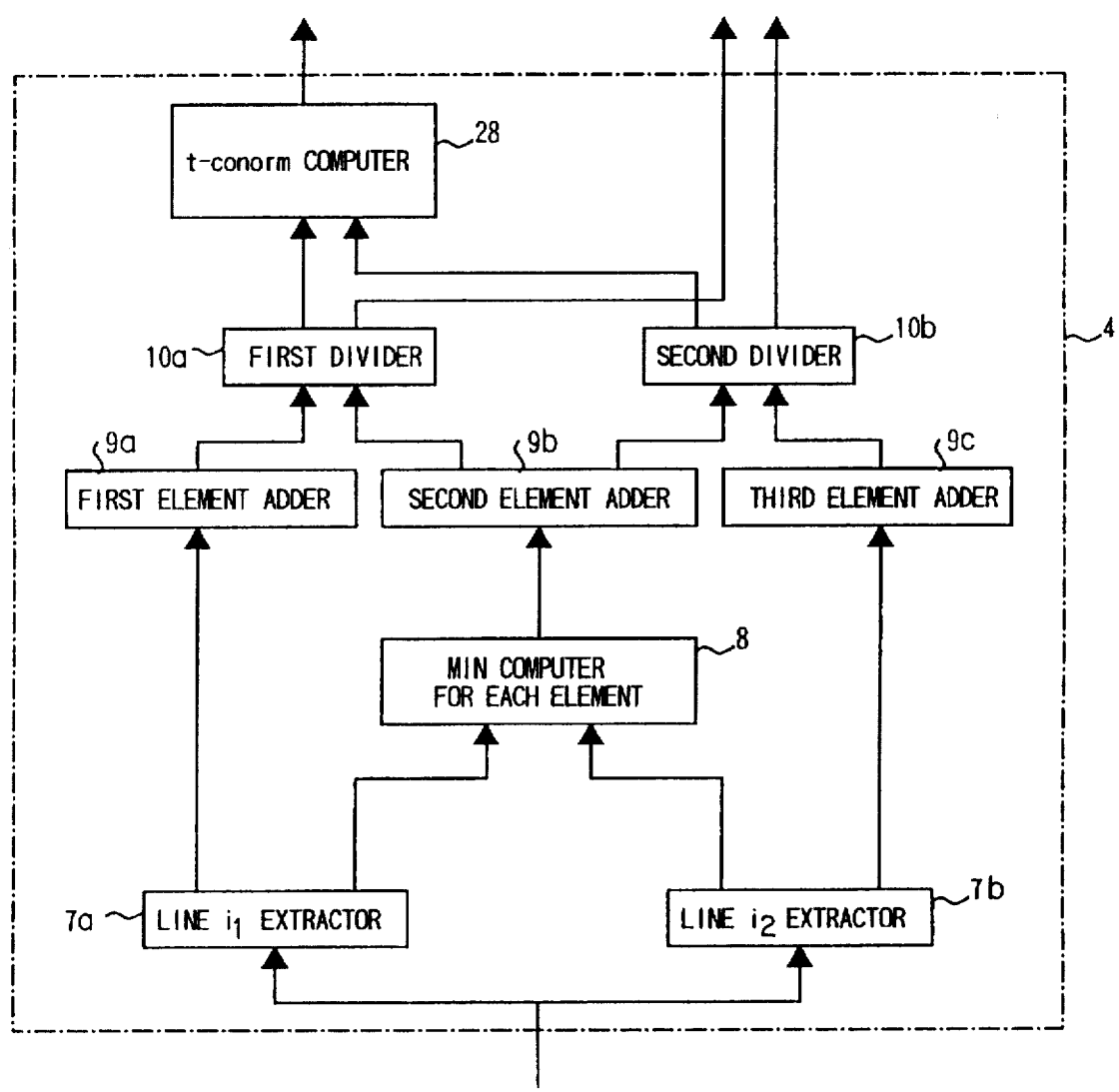
FIG. 23 is a block diagram showing Embodiment 17 according to the present invention.

FIG. 23 is a block diagram showing a fuzzy thesaurus generator according to Embodiment 17 of the present invention. In this figure, the reference numeral 28 indicates a t-conorm computer.

Next, a description is made for operations in this embodiment. The t-conorm computer 28 receives a scalar outputted from the first divider 10a and a scalar outputted from the second divider 10b, executes the processing as indicated by the following expression, and outputs a result of the processing. This processing indicates fuzzy OR condition, but the characteristics changes according to how the parameter p is set.

$$S(x,y) = 1 \wedge^p \sqrt{x^p + y^p}\ ; 0 < p < \infty \qquad (10)$$

As described above, in this Embodiment 17, there is provided a t-conorm computer in place of a MIN computer of an inter-index attribute value fuzzy relation computing section, so that it is possible to generate a fuzzy thesaurus by computing which can effectively respond to many types of index and is closer to human sensitivity when a relation between two elements is evaluated according to a frequency of simultaneous appearance.

A fuzzy thesaurus unifying section of a fuzzy thesaurus generator may comprises a t-conorm computer.

Figure 24:
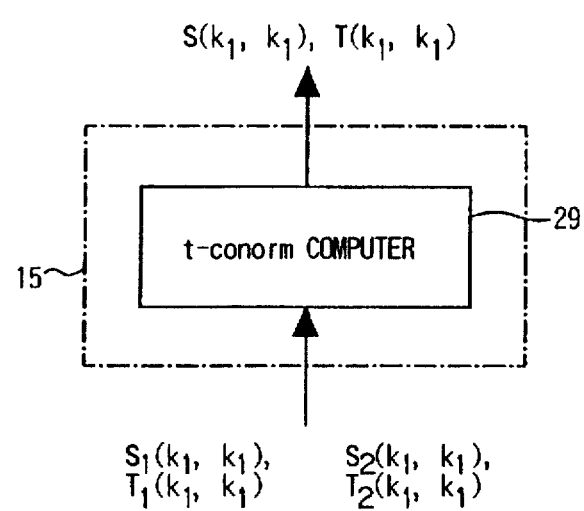
FIG. 24 is a block diagram showing Embodiment 18 according to the present invention.
Figure 25:
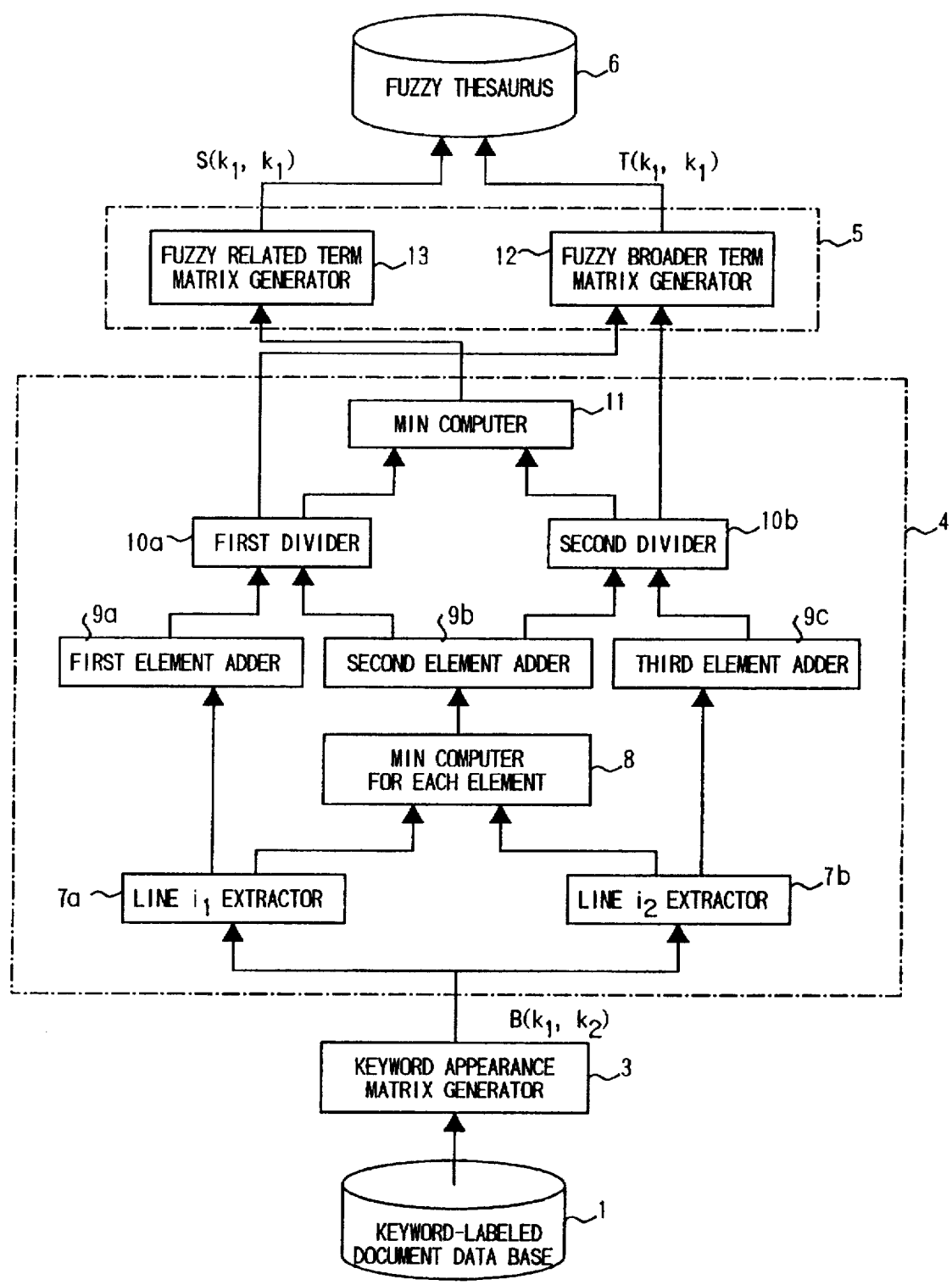
FIG. 25 is a block diagram showing a conventional type of fuzzy thesaurus generator.
Figures 26, 27:
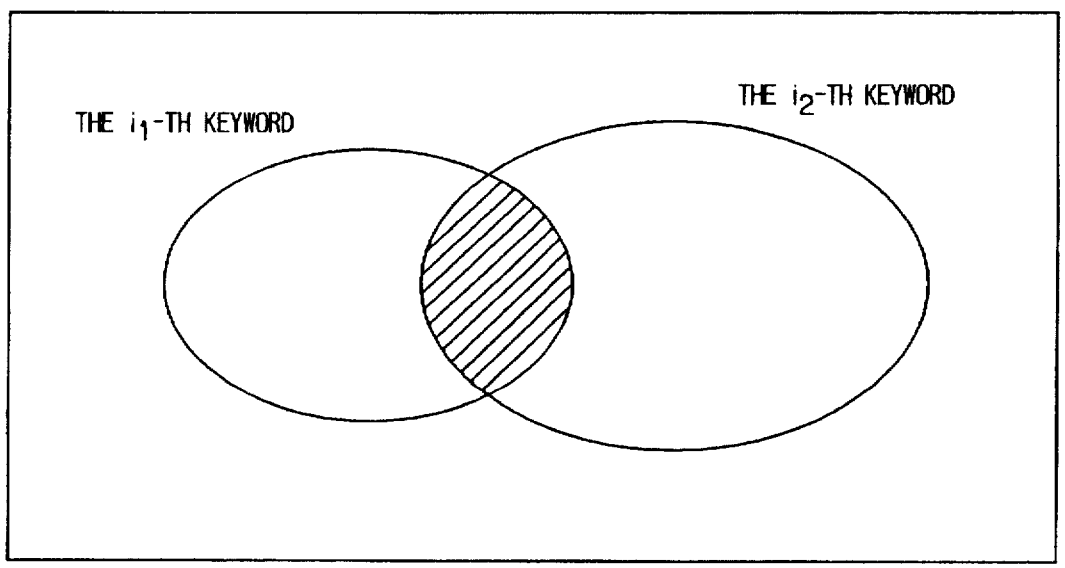
FIG. 26 is a view showing a keyword appearance matrix in the conventional type of fuzzy thesaurus generator.
FIG. 27 is a graph for explanation of meaning of division in the conventional type of fuzzy thesaurus generator.

FIG. 24 is a block diagram showing a fuzzy thesaurus generator according to Embodiment 18 of the present invention. In this figure, the fuzzy thesaurus unifying section 15 comprises the t-conorm computer 29.

Next, a description is made for operations in this embodiment. The t-conorm computer 29 in the fuzzy thesaurus unifying section 15 receives two fuzzy thesaurus related term matrixes $S_1$ ($k_1$, $k_1$) and $S_2$ ($k_1$, $k_1$), executes the processing as indicated by the expression (10), and outputs a fuzzy related term matrix $S$ ($k_1$, $k_1$). This processing indicates fuzzy OR condition, and the characteristics changes according to how the parameter p is set.

The t-conorm computer 29 in the fuzzy thesaurus unifying section 15 receives two fuzzy broader term matrixes $T_1$ ($k_1$, $k_1$) and $T_2$ ($k_1$, $k_1$), executes the processing as indicated by the expression (10), and outputs a fuzzy broader term matrix $T$ ($k_1$, $k_1$). This processing indicates fuzzy OR condition, and the characteristics changes according to how the parameter p is set.

As described above, in this embodiment 18, the thesaurus unifying section comprises a t-conorm computer, so that it is possible to generate a fuzzy thesaurus by computing which can respond to many types of index and is closer to human sensitivity when a relation between two elements is evaluated based on evaluation of other discrete indexes.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A fuzzy thesaurus generator comprising:
   a first index appearance matrix generator for outputting a first index appearance matrix indicating a relation between a first index and a case according to an index-labeled case from an index-labeled database of cases;

a second index appearance matrix generator for outputting a second index appearance matrix indicating a relation between a second index and said case according to said case;

a cross index matrix generator for outputting a cross index matrix indicating a relation between said first index and said second index according to said first index appearance matrix as well as to said second index appearance matrix;

an inter-index attribute value fuzzy relation computing section for outputting a fuzzy relation between index attribute values in said first index evaluated from said relation with said second index according to said cross index appearance matrix; and a fuzzy thesaurus generating section for outputting a fuzzy thesaurus relating to said first index according to said fuzzy relation between said index attribute values in said first index.

2. A fuzzy thesaurus generator according to claim 1; wherein said inter-index attribute value fuzzy relation computing section comprises:

a first line extractor for outputting values of elements in a first line of said cross index matrix;

a second line extractor for outputting values of elements in a second line of said cross index matrix;

a MIN computer for each element for outputting either smaller one of said first line element and said second line element according to an output from said first line extractor and an output from said second extractor;

a first element adder for summing elements in an output from said first line extractor;

a second element adder for summing elements in an output from said MIN computer for each element;

a third element adder for summing elements in an output from said second line extractor;

a first divider for executing division according to an output from said first element adder and an output from said second element adder and outputting a result of the division;

a second divider for executing division according to an output from second element adder and an output from said third element adder and outputting a result of the division; and a MIN computer for outputting either smaller one of said output from said first divider and an output from said second divider;

and said fuzzy thesaurus generating section comprises:

a fuzzy related term matrix generator for outputting a fuzzy thesaurus indicating a relation between related terms according to an output from said MIN computer; and a fuzzy broader term generator for outputting a fuzzy thesaurus indicating a relation between a broader term and a narrower term according to an output from said first divider as well as to an output from second divider.

3. A fuzzy thesaurus generator according to claim 2; wherein said inter-index attribute value fuzzy relation computing section comprises a convertor for converting either smaller one of an output from said first divider and an output from said second divider to zero (0) and then sending an output from said first divider and an output from said second divider respectively to said fuzzy thesaurus generating section.

4. A fuzzy thesaurus generator according to claim 2; wherein said inter-index attribute value fuzzy relation computing section comprises:

a first substituter for converting, when an output value from said first line extractor is more than 1, said value to 1 and outputting said value to said first element adder;

a second substituter for converting, when an output value from said MIN computer for each element described above is more than 1, said value to 1 and outputting said value to said second element adder; and a third substituter for converting, when an output value from said second line extractor is more than 1, said value to 1 and outputting said value to said third element adder.

5. A fuzzy thesaurus generator according to claim 2; wherein said inter-index attribute value fuzzy relation computing section comprises:

a first normalizer for normalizing an output from said first line extractor and outputting said normalized value to said first element adder;

a second normalizer for normalizing an output from said second line extractor and outputting said normalized value to said third element adder; and an element multiplier, in place of said MIN computer for each element described above, for multiplying elements in an output from said first normalizer as well as in an output from said second normalizer and outputting a result of multiplication to said second element adder.

6. A fuzzy thesaurus generator according to claim 2; wherein said inter-index attribute value fuzzy relation computing section comprises:

a comparator for comparing an output value from said first line extractor to that from said second line extractor for each element, converting a value of either smaller one, when a difference between these elements is large, to zero (0), and outputting said value to said MIN computer for each element.

7. A fuzzy thesaurus generator according to claim 2, wherein a zone value computer for computing a zone value for an output from said first divider as well as an output from said second divider is provided in place of said MIN computer in said inter-index attribute value fuzzy relation computing section.

8. A fuzzy thesaurus generator according to claim 2, wherein a t-norm computer for obtaining a fuzzy AND condition for an output from said first divider as well as that from said second divider is provided in place of said MIN computer of said inter-index attribute value fuzzy relation computing section.

9. A fuzzy thesaurus generator according to claim 2, wherein a t-conorm computer for obtaining a fuzzy OR condition for an output from said first divider as well as for an output from said second divider is provided in place of said MIN computer of said inter-index attribute value fuzzy relation computing section.

10. A fuzzy thesaurus generator according to claim 2, wherein said fuzzy thesaurus generator comprises:

a first transitive package computer for generating and outputting a transitive package according to an input of a fuzzy related term matrix from said fuzzy related term matrix generator; and a second transitive package computer for generating and outputting a transitive package according to an input of a fuzzy broader term matrix from said fuzzy broader term matrix generator.

11. A fuzzy thesaurus generator comprising:

a first index appearance matrix generator for outputting a first index appearance matrix indicating a relation between a first index and a case according to an index-labeled case from an index-labeled database of cases;

a second index appearance matrix generator for outputting a second index appearance matrix indicating a relation between a second index and said case according to said case;

a third index appearance matrix generator for outputting a third index appearance matrix indicating a relation between a third index and said case according to said case;

a first cross index matrix generator for outputting a first cross index matrix indicating a relation between said first index and said second index according to said first index appearance matrix as well as to said second index appearance matrix;

a second cross index matrix generator for outputting a second cross index matrix indicating a relation between said first index and said third index according to said first index appearance matrix as well as to said third index appearance matrix;

a first inter-index attribute value fuzzy relation computing section for outputting a fuzzy relation between index attribute values in said first index evaluated from a relation with said second index according to said first cross index matrix;

a second inter-index attribute value fuzzy relation computing section for outputting a fuzzy relation between index attribute values in said first index evaluated from a relation with said third index according to said second cross index matrix;

a first fuzzy thesaurus generating section for outputting a fuzzy thesaurus for said first index evaluated from a relation with said second index according to a fuzzy relation between index attribute values in said first index;

a second fuzzy thesaurus generating section for outputting a fuzzy thesaurus for said first index evaluated from a relation with said third index according to a fuzzy relation between index attribute values in said second index; and a thesaurus unifying section for outputting a fuzzy thesaurus relating to said first index according to output from said first fuzzy thesaurus generating section as well as to output from said second thesaurus generating section.

12. A fuzzy thesaurus generator according to claim 11 wherein at least one of said first and second inter-index attribute value fuzzy relation computing sections comprises:

a first line extractor for outputting values of elements in a first line of a respective cross index matrix;

a second line extractor for outputting values of elements in a second line of said respective cross index matrix;

a MIN computer for each element for outputting either smaller one of said first line element and said second line element according to an output from said first line extractor and an output from said second extractor;

a first element adder for summing elements in an output from said first line extractor;

a second element adder for summing elements in an output from said MIN computer for each element;

a third element adder for summing elements in an output from said second line extractor;

a first divider for executing division according to an output from said first element adder and an output from said second element adder and outputting a result of the division;

a second divider for executing division according to an output from second element adder and an output from said third element adder and outputting a result of the division; and a MIN computer for outputting either smaller one of said output from said first divider and an output from said second divider;

and a respective one of said first and second fuzzy thesaurus generating sections comprises:

a fuzzy related term matrix generator for outputting a fuzzy thesaurus indicating a relation between related terms according to an output from said MIN computer; and a fuzzy broader term generator for outputting a fuzzy thesaurus indicating a relation between a broader term and a narrower term according to an output from said first divider as w ell as to an output from second divider.

13. A fuzzy thesaurus generator according to claim 12; wherein said at least one of said first and second inter-index attribute value fuzzy relation computing sections comprises a convertor for converting either smaller one of an output from said first divider and an output from said second divider to zero (0) and then sending an output from said first divider and an output from said second divider respectively to said respective fuzzy thesaurus generating section.

14. A fuzzy thesaurus generator according to claim 12; wherein said at least one of said first and second inter-index attribute value fuzzy relation computing sections comprises:

first substituter for converting, when an output value from said first line extractor is more than 1, said value to 1 and outputting said value to said first element adder;

a second substituter for converting, when an output value from said MIN computer for each element is more than 1, said value to 1 and outputting said value to said second element adder; and a third substituter for converting, when an output value from said second line extractor is more than 1, said value to 1 and outputting said value to said third element adder.

15. A fuzzy thesaurus generator according to claim 12; wherein said at least one of said first and second inter-index attribute value fuzzy relation computing section comprises:

a first normalizer for normalizing an output from said first line extractor and outputting said normalized value to said first element adder;

a second normalizer for normalizing an output from said second line extractor and out putting said normalized value to said third element adder; and an element multiplier, in place of said MIN computer for each element described above, for multiplying elements in an output from said first normalizer as well as in an output from said second normalizer and outputting a result of multiplication to said second element adder.

16. A fuzzy thesaurus generator according to claim 12; wherein said at least one of said first and second inter-index attribute value fuzzy relation computing sections comprises:

a comparator for comparing an output value from said first line extractor to that from said second line extractor for each element, converting a value of either smaller one, when a difference between these elements is large, to zero (0), and outputting said value to said MIN computer for each element.

17. A fuzzy thesaurus generator according to claim 12, wherein a zone value computer for computing a zone value for an output from said first divider as well as an output from said second divider is provided in place of said MIN computer in said at least one of said first and second inter-index attribute value fuzzy relation computing sections.

18. A fuzzy thesaurus generator according to claim 12; wherein a t-norm computer for obtaining a fuzzy AND condition for an output from said first divider as well as that from said second divider is provided in place of said MIN computer of said at least one of said first and second inter-index attribute value fuzzy relation computing sections.

19. A fuzzy thesaurus generator according to claim 12; wherein a t-conorm computer for obtaining a fuzzy OR condition for an output from said first divider as well as for an output from said second divider is provided in place of said MIN computer of said at least one of said first and second inter-index attribute value fuzzy relation computing sections.

20. A fuzzy thesaurus generator according to claim 12; wherein said respective fuzzy thesaurus generator comprises:
- a first transitive package computer for generating and outputting a transitive package according to an input of a fuzzy related term matrix from said fuzzy related term matrix generator; and
- a second transitive package computer for generating and outputting a transitive package according to an input of a fuzzy broader term matrix from said fuzzy broader term matrix generator.

21. A fuzzy thesaurus generator according to claim 11; wherein said thesaurus unifying section comprises an average computer for averaging two matrixes inputted thereto and outputting a result of said averaging operation.

22. A fuzzy thesaurus generator according to claim 11; wherein said thesaurus unifying section comprises a zone value computer for computing a zone value between said inputted two matrixes.

23. A fuzzy thesaurus generator according to claim 11; wherein said thesaurus unifying section comprises a t-norm computer for obtaining a fuzzy AND condition between said inputted two matrixes.

24. A fuzzy thesaurus generator according to claim 11; wherein said thesaurus unifying section comprises a t-conorm computer for obtaining a fuzzy OR condition between said inputted two matrixes.

25. A fuzzy thesaurus generator comprising:
- a first index appearance matrix generator for outputting a first index appearance matrix indicating a relation between a first index and a case according to an index-labeled case from an index-labeled database of cases;
- a second index appearance matrix generator for outputting a second index appearance matrix indicating a relation between a second index and said case according to said case;
- a third index appearance matrix generator for outputting a third index appearance matrix indicating a relation between a third index and said case according to said case;
- a first cross index matrix generator for outputting a first cross index matrix indicating a relation between said first index and said second index according to said first index appearance matrix as well as to said second index appearance matrix;
- a second cross index matrix generator for outputting a second cross index matrix indicating a relation between said second index and said third index according to said second index appearance matrix as well as to said third index appearance matrix;
- a third cross index matrix generator for outputting a third cross index matrix indicating a relation between said first index and said third index according to said first cross index matrix as well as to said second cross index matrix;
- an inter-index attribute value fuzzy relation computing section for outputting a relation between index attribute values in said first index according to said third cross index matrix; and
- a fuzzy thesaurus generating section for outputting a fuzzy thesaurus concerning said first index according to the relation between index attribute values in said first index.

26. A fuzzy thesaurus generator according to claim 25; wherein said inter-index attribute value fuzzy relation computing section comprises:
- a first line extractor for outputting values of elements in a first line of said cross index matrix;
- a second line extractor for outputting values of elements in a second line of said cross index matrix;
- a MIN computer for each element for outputting either smaller one of said first line element and said second line element according to an output from said first line extractor and an output from said second extractor;
- a first element adder for summing elements in an output from said first line extractor;
- a second element adder for summing elements in an output from said MIN computer for each element;
- a third element adder for summing elements in an output from said second line extractor;
- a first divider for executing division according to an output from said first element adder and an output from said second element adder and outputting a result of the division;
- a second divider for executing division according to an output from second element adder and an output from said third element adder and outputting a result of the division; and
- a MIN computer for outputting either smaller one of said output from said first divider and an output from said second divider;

and said fuzzy thesaurus generating section comprises:
- a fuzzy related term matrix generator for outputting a fuzzy thesaurus indicating a relation between related terms according to an output from said MIN computer; and
- a fuzzy broader term generator for outputting a fuzzy thesaurus indicating a relation between a broader term and a narrower term according to an output from said first divider as well as to an output from second divider.

27. A fuzzy thesaurus generator according to claim 26; wherein said inter-index attribute value fuzzy relation computing section comprises a convertor for converting either smaller one of an output from said first divider and an output from said second divider to zero (0) and then sending an output from said first divider and an output from said second divider respectively to said fuzzy thesaurus generating section.

28. A fuzzy thesaurus generator according to claim 26; wherein said inter-index attribute value fuzzy relation computing section comprises:
- a first substituter for converting, when an output value from said first line extractor is more than 1, said value to 1 and outputting said value to said first element adder;

a second substituter for converting, when an output value from said MIN computer for each element described above is more than 1, said value to 1 and outputting said value to said second element adder; and a third substituter for converting, when an output value from said second line extractor is more than 1, said value to 1 and outputting said value to said third element adder.

29. A fuzzy thesaurus generator according to claim 26; wherein said inter-index attribute value fuzzy relation computing section comprises:

a first normalizer for normalizing an output from said first line extractor and outputting said normalized value to said first element adder;

a second normalizer for normalizing an output from said second line extractor and outputting said normalized value to said third element adder; and an element multiplier, in place of said MIN computer for each element described above, for multiplying elements in an output from said first normalizer as well as in an output from said second normalizer and outputting a result of multiplication to said second element adder.

30. A fuzzy thesaurus generator according to claim 26; wherein said inter-index attribute value fuzzy relation computing section comprises:

a comparator for comparing an output value from said first line extractor to that from said second line extractor for each element, converting a value of either smaller one, when a difference between these elements is large, to zero (0), and outputting said value to said MIN computer for each element.

31. A fuzzy thesaurus generator according to claim 26, wherein a zone value computer for computing a zone value for an output from said first divider as well as an output from said second divider is provided in place of said MIN computer in said inter-index attribute value fuzzy relation computing section.

32. A fuzzy thesaurus generator according to claim 26; wherein a t-norm computer for obtaining a fuzzy AND condition for an output from said first divider as well as that from said second divider is provided in place of said MIN computer of said inter-index attribute value fuzzy relation computing section.

33. A fuzzy thesaurus generator according to claim 26; wherein a t-conorm computer for obtaining a fuzzy OR condition for an output from said first divider as well as for an output from said second divider is provided in place of said MIN computer of said inter-index attribute value fuzzy relation computing section.

34. A fuzzy thesaurus generator according to claim 26; wherein said fuzzy thesaurus generator comprises:

a first transitive package computer for generating and outputting a transitive package according to an input of a fuzzy related term matrix from said fuzzy related term matrix generator; and a second transitive package computer for generating and outputting a transitive package according to an input of a fuzzy broader term matrix from said fuzzy broader term matrix generator.

35. A fuzzy thesaurus generator comprising:

a first index appearance matrix generator for outputting a first index appearance matrix indicating a relation between a first index and a case according to an index-labeled case from an index-labeled database of cases;

a second index appearance matrix generator for outputting a second index appearance matrix indicating a relation between a second index and said case according to said case;

a cross index matrix generator for outputting a cross index matrix indicating a relation between said first index and said second index according to said first index appearance matrix as well as to said second index appearance matrix; and an other index reference type fuzzy thesaurus generator for outputting a fuzzy thesaurus concerning said first index according to said fuzzy thesaurus concerning said second index previously given and said cross index matrix.

36. A fuzzy thesaurus generator comprising:

a first index appearance matrix generator for outputting a first index appearance matrix indicating a relation between a first index and a case according to an index-labeled case from an index-labeled database of cases;

a second index appearance matrix generator for outputting a second index appearance matrix indicating a relation between a second index and said case according to said case;

a third index appearance matrix generator for outputting a third index appearance matrix indicating a relation between a third index and said case according to said case;

a first cross index matrix generator for outputting a first cross index matrix indicating a relation between said first index and said second index according to said first index appearance matrix as well as to said second index appearance matrix;

a second cross index matrix generator for outputting a second cross index matrix indicating a relation between said first index and said third index according to said first index appearance matrix as well as to said third index appearance matrix;

a first other index reference type fuzzy thesaurus generator for outputting a fuzzy thesaurus concerning said first index evaluated from a relation between fuzzy thesaurus concerning said second index previously given and a fuzzy thesaurus for said second index according to said first cross index matrix;

a second other index reference type fuzzy thesaurus generator for outputting a fuzzy thesaurus concerning said first index evaluated from a relation between a fuzzy thesaurus concerning said third index previously given and a fuzzy thesaurus for said third index according to said second cross index matrix; and a thesaurus unifying section for outputting a fuzzy thesaurus concerning said first index according to an output from said first other index reference type fuzzy thesaurus generator as well as to an output from said second other index reference type fuzzy thesaurus generator.

37. A fuzzy thesaurus generator according to claim 36; wherein said thesaurus unifying section comprises an average computer for averaging two matrixes inputted thereto and outputting a result of said averaging operation.

38. A fuzzy thesaurus generator according to claim 36; wherein said thesaurus unifying section comprises a zone value computer for computing a zone value between said inputted two matrixes.

39. A fuzzy thesaurus generator according to claim 36; wherein said thesaurus unifying section comprises a t-norm computer for obtaining a fuzzy AND condition between said inputted two matrixes.

40. A fuzzy thesaurus generator according to claim 36; wherein said thesaurus unifying section comprises a t-conorm computer for obtaining a fuzzy OR condition between said inputted two matrixes.

* * * * *